United States Patent
Sih et al.

(10) Patent No.: US 7,502,911 B2
(45) Date of Patent: Mar. 10, 2009

(54) VARIABLE LENGTH INSTRUCTION FETCHING THAT RETRIEVES SECOND INSTRUCTION IN DEPENDENCE UPON FIRST INSTRUCTION LENGTH

(75) Inventors: Gilbert C. Sih, San Diego, CA (US); Qiuzhen Zou, San Diego, CA (US); Jian Lin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/535,005

(22) Filed: Sep. 25, 2006

(65) Prior Publication Data

US 2007/0186079 A1     Aug. 9, 2007

Related U.S. Application Data

(60) Division of application No. 10/269,776, filed on Oct. 11, 2002, now abandoned, which is a continuation of application No. 09/044,088, filed on Mar. 18, 1998, now Pat. No. 6,496,920.

(51) Int. Cl.
*G06F 9/30*     (2006.01)
(52) U.S. Cl. ................................ 712/210; 712/205
(58) Field of Classification Search ................. 712/210, 712/24, 204, 205–207
See application file for complete search history.

(56) References Cited

U.S. PATENT DOCUMENTS

| 4,502,111 | A | * | 2/1985 | Riffe et al. ................. 712/204 |
| 4,594,655 | A | | 6/1986 | Hao et al. |
| 4,654,781 | A | * | 3/1987 | Schwartz et al. ............ 711/219 |
| 5,367,701 | A | | 11/1994 | Von Gnechten et al. |
| 5,625,784 | A | * | 4/1997 | Purcell ....................... 712/210 |
| 5,673,410 | A | * | 9/1997 | Kurisu ....................... 712/210 |
| 5,826,055 | A | | 10/1998 | Wang et al. |
| 5,862,399 | A | | 1/1999 | Slavenburg et al. |
| 5,884,092 | A | | 3/1999 | Kiuchi et al. |
| 6,363,475 | B1 | | 3/2002 | Dowling |
| 6,615,341 | B2 | | 9/2003 | Sih et al. |

FOREIGN PATENT DOCUMENTS

WO     97050030     12/1997

OTHER PUBLICATIONS

Texas Instruments Digital Signal Processing Products Users Guide, pp. 2/2 - 2/3, Jul. 1992.
Qualcomm Incorporated's CDMA Vocoder ASIC High Level Design, pp. 90 and 95, Feb. 1994.

(Continued)

*Primary Examiner*—Richard Ellis
(74) *Attorney, Agent, or Firm*—Nicholas J. Pauley; Joseph B. Agusta; Sam Talpalatsky

(57) ABSTRACT

A digital signal processor uses a variable length instruction set. The variable length instructions may be stored in adjacent locations within memory space. The beginning and ending of instructions may, but are not required to, occur across memory word boundaries. Preferably, the variable length instructions contain variable numbers of instruction fragments. Each instruction fragment causes a particular operation (or operations) to be performed, thereby allowing multiple operations to be performed during each clock cycle. This reduces the total number of clock cycles necessary to perform a task.

20 Claims, 9 Drawing Sheets

OTHER PUBLICATIONS

TCSI Corporation LODE DSP Engine Presentation, 37 pages Aug. 1995.
Texas Instruments Fixed Point Digital Signal Processor TMS 320 C54X High Level Design, Chapter 3, Feb. 1996.
Analog Devices ADSP-21csp01 Preliminary Data Sheet, pp. 1-48, Oct. 1995.
Analog Devices ADSP-21060/62 SHARC Preliminary Data Sheet, pp. 1-54, Nov. 1994.
McDonough, Qualcomm Incorporated Presentation entitled "QDSP and the Vocoder ASICS".
AT&T Microelectronics DSP1617 Digital Signal Processor Preliminary Data Sheet pp. 1-147, Aug. 1993.
AT&T Microelectronics DSP1617 Digital Signal Processor Advanced Data Sheet pp. 1-131, Jan. 1995.
Analog Devices, DSP Microcomputers ADSP-2181/ADSP-2183 Data Sheet, pp. 1-40, 1996.
Analog Devices: ADSP-21060/62 SHARC Preliminary Data Sheet, p. 1-54, Nov. 1994.
Analog Devices: ADSP-21csp01 Preliminary Data Sheet, p. 1-48, Oct. 1995.
Analog Devices: DSP Microcomputers, ADSP-2181/ADSP-2183 Data Sheet, p. 1-40, 1996.
AT&T Microelectronics: DSP1617 Digital Signal Processor Preliminary Data Sheet p. 147, Aug. 1993.
AT&T Microelectronics: DSP1627 Digital Signal Processor Preliminary Data Sheet p. 1-131, Jan. 1995.
McDonough: "QDSP and the Vocoder ASICS", Qualcomm Incorporated Presentation, date unknown.
Qualcomm Inc.'s: "CDMA Vocoder ASIC High Level Design", p. 90 and 95, Feb. 1994.
T.I.: "Fixed Point Digital Signal Processor TMS 320 C54X High Level Design", Chp. 3, Feb. 1996.
T.I.: "Texas Instruments Digital Signal Processing Products Users Guide", p. 2/2 - 2/3, Jul. 1992.
TCSI Corporation: "LODE DSP Engine Presentation", 37 pages, Aug. 1995.

* cited by examiner

VARIABLE LENGTH INSTRUCTION FETCHING THAT RETRIEVES SECOND INSTRUCTION IN DEPENDENCE UPON FIRST INSTRUCTION LENGTH

RELATED APPLICATIONS

This application is a divisional of U.S. application Ser. No. 10/269,776, filed on Oct. 11, 2002, which is a continuation of U.S. application Ser. No. 09/044,088 filed on Mar. 18, 1998.

BACKGROUND OF THE INVENTION

1. Field of the Invention

The present invention relates to digital signal processors. More specifically, the present invention relates to digital signal processing using highly parallel, highly pipelined, processing techniques.

2. Description of the Related Art

Digital Signal Processors (DSPs) are generally used for real time processing of digital signals. A digital signal is typically a series of numbers, or digital values, used to represent a corresponding analog signal. DSPs are used in a wide variety of applications including audio systems such as compact disk players, and wireless communication systems such as cellular telephones.

A DSP is often considered to be a specialized form of microprocessor. Like a microprocessor, a DSP is typically implemented on a silicon based semiconductor integrated circuit. Additionally, as with microprocessors, the computing power of DSPs is enhanced by using reduced instruction set (RISC) computing techniques. RISC computing techniques include using smaller numbers of like sized instructions to control the operation of the DSP, where each instruction is executed in the same amount of time. The use of RISC computing techniques increases the rate at which instruction are performed, or the clock rate, as well as the amount of instruction pipelining within the DSP. This increases the overall computing power of the DSP.

Configuring a DSP using RISC computing techniques also creates undesirable characteristics. In particular, RISC based DSPs execute a greater number of instructions to perform a given task. Executing additional instructions increases the power consumption of the DSP, even though the time to execute those instructions decreases due to the improved clocking speed of a RISC based DSP. Additionally, using a greater number of instructions increases the size of the on-chip instruction memory within the DSP. Memory structures require substantial (often more than 50% of the total) circuit area within a DSP, which increases the size and cost of the DSP. Thus, the use of RISC based DSPs is less than ideal for low cost, low power, applications such as digital cellular telephony or other types of battery operation wireless communication systems.

FIG. 1 is a highly simplified block diagram of a digital signal processor configured in accordance with the prior art. Arithmetic logic unit (ALU) 16 is coupled to ALU register bank 17 and multiply accumulate (MAC) circuit 26 is coupled to MAC register bank 27. Data bus 20 couples MAC register bank 27, ALU register 17 and (on chip) data memory 10. Instruction bus 22 couples MAC register bank 27, (on-chip) instruction memory 12, MAC register bank 27 and ALU register bank 17. Instruction decode 18 is coupled to MAC 26 and ALU 16, and in some prior art systems instruction decode 18 is coupled directly to instruction memory 12. Data memory 10 is also coupled to data interface 11 and instruction memory 12 is also coupled to instruction interface 13. Data interface 12 and instruction interface 12 exchange data and instructions with off-chip memory 6.

During operation, the instructions in instruction memory 12 are decoded by instruction decode 18. In response, instruction decode 18 generates internal control signals that are applied to ALU 16 and MAC 26. The control signals typically cause ALU 16 to have data exchanged between ALU register bank 17 and data memory 10 or instruction memory 12. Also, the control signals cause MAC 26 to have instruction data exchanged between MAC register bank 27 and instruction memory 12 or data memory 10. Additionally, the control signals cause ALU 16 and MAC 26 to perform various operations in response to, and on, the data stored in ALU register bank 17 and MAC register bank 27 respectively.

In an exemplary operation, instruction memory 12 may contain coefficient data for use by ALU 16 and MAC 26 and data memory 10 may contain data to be processed (signal data). The coefficient data may be for implementing a frequency filter using the DSP, which is a common practice. As the filtering is performed, both the signal data from data memory 10 and the coefficient data from instruction memory 12 are read into MAC register 27. Additional instruction data within instruction memory 12 is also applied to instruction decode 18, either through instruction data bus 22 or through a direct connection. The additional instruction data specifies the operation to be performed by MAC 26. The results generated by MAC 26 are typically read back into data memory 10.

Many processing inefficiencies result from this prior art processing. These processing inefficiencies include, e.g., bus, or access contention, to instruction memory 12, which must supply instruction data to both MAC register 26 and instruction decode 18, as well as bus, or access contention, to data memory 10, which must both read out signal data and write in the output data. Additionally, in many instances, additional processing on the output data must be performed by ALU 16. This further aggravates access to data memory 10, and therefore creates contention for data bus 20, because the output data must be written from MAC register bank 27 into data memory 10, and then read out to ALU register 17. These read and write operation are performed over bus 20 and therefore consume additional bus cycles. Such inefficiencies reduce the processing performance of the DSP.

The present invention seeks to improve the performance and usefulness of a DSP by addressing the problems and inefficiencies listed above, as well as by providing other features and improvements described throughout the application.

SUMMARY OF THE INVENTION

The present invention is a novel and improved method and circuit for digital signal processing. One aspect of the invention calls for the use of a variable length instruction set. A portion of the variable length instructions may be stored in adjacent locations within memory space with the beginning and ending of instructions occurring across memory word boundaries. Furthermore, additional aspects of the invention are realized by having instructions contain variable numbers of instruction fragments. Each instruction fragment causes a particular operation, or operations, to be performed allowing multiple operations during each clock cycle. Thus, multiple operations are performed during each clock cycle, reducing the total number of clock cycles necessary to perform a task.

The exemplary DSP includes a set of three data buses over which data may be exchanged with a register bank and three data memories. The use of more than two data buses, and especially three data buses, realizes another aspect of the invention, which is significantly reduced bus contention. One embodiment of the invention calls for the data buses to include one wide bus and two narrow buses. The wide bus is coupled to a wide data memory and the two narrow buses are coupled to two narrow data memories.

Another aspect of the invention is realized by the use of a register bank that has registers accessible by at least two processing units. This allows multiple operations to be performed on a particular set of data by the multiple processing units, without reading and writing the data to and from a memory. The processing units in the exemplary embodiment of the invention include an arithmetic logic (ALU) and a multiply-accumulate (MAC) unit. When combined with the use of the multiple bus architecture, highly parallel instructions, or both, an additional aspect of the invention is realized where highly pipelined, multi-operation, processing is performed.

Other aspects of the invention are realized by including an instruction fetch unit that receives instructions of variable length stored in an instruction memory. Still another aspect of the invention is realized by an instruction memory that is separate from the set of three data memories. An instruction decoder decodes the instructions from the instruction memory and generates control signals that causes data to be exchanged between the various registers, data memories, and functional units allowing multiple operations to be performed during each clock cycle.

Additionally, the various aspect of the invention combine synergistically, to provide unexpected and desirable results. For example, the use of variable length instructions that are stored consecutively within memory reduces the necessary circuit area of the DSP. This reduction facilitates adding multiple data buses to the DSP, as well as the addition of registers that are accessible by multiple processing units, increasing the overall performance of the DSP. Other synergistic benefits provided by the combination of the various aspects of the invention are apparent, and are described in greater detail below.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The present invention is a novel and improved method and circuit for digital signal processing. Throughout the application various references are made to signals, instructions, and data. These signals, instructions, and data are preferable represented by electrical voltages, currents, current stores including charged, optical, or magnetic particles, or some combination thereof, the use of which is well known. The use of various chemical and biological compounds to represent such signals, instructions, and data is generally consistent with the use of the present invention as well, although not preferred due to the difficulty to use, control and manipulate such items.

Additionally, reference is made to various aspects, benefits, features, or advantages of the invention (referred to herein collectively as aspects, when not referred to in the particular.) In some embodiments of the invention, these different aspects may be realized alone, without the presence of any of the other aspects of the invention. However, in other embodiments of the invention, two or more aspects of the invention may be realized together, to produce synergistic and unexpected advantages that are greater than those provided by embodiments of the invention that realize only one aspect of the two or more combined aspects of the invention.

DSP Operation and Instruction Storage

Figure 1:
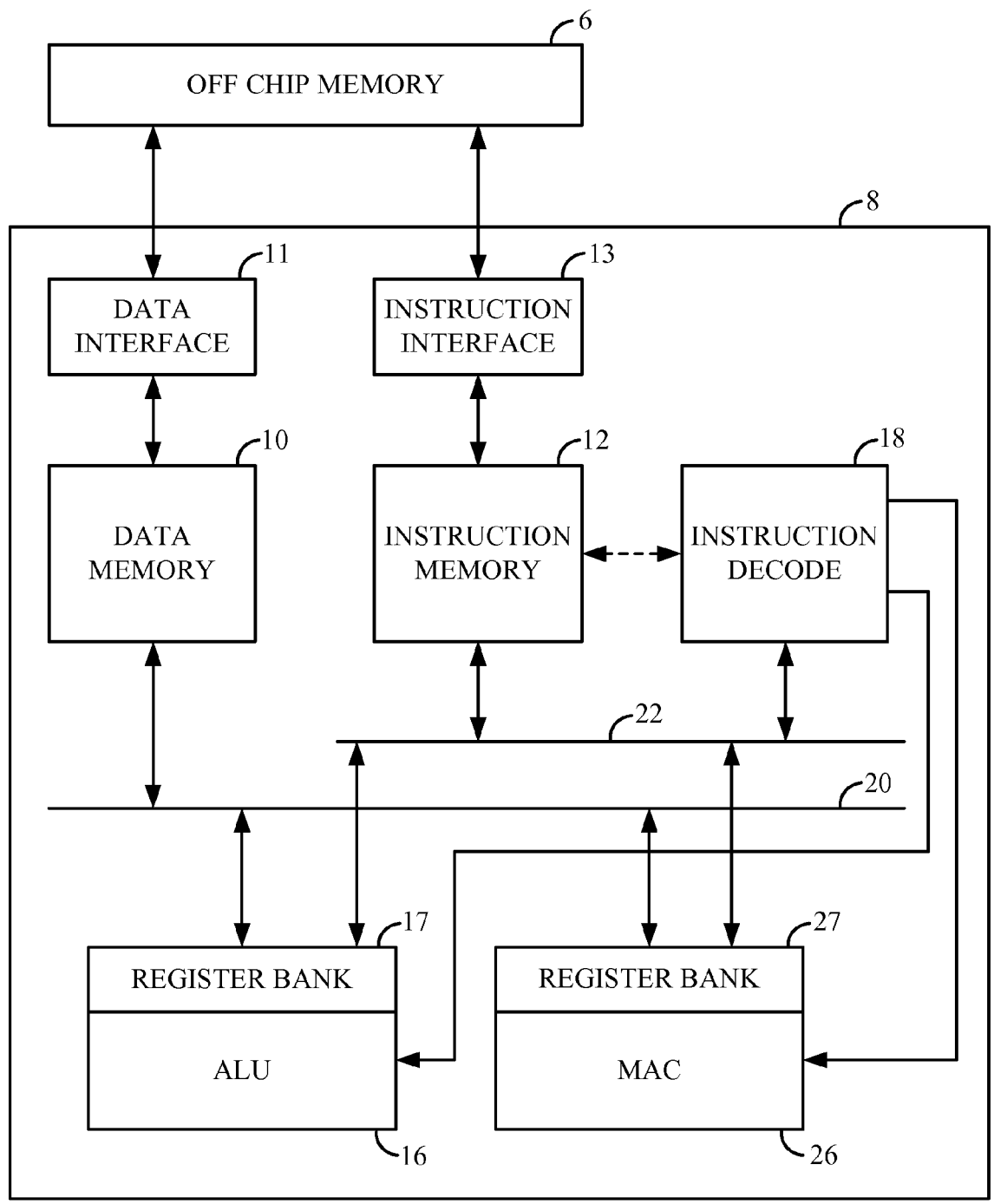
FIG. 1 is a block diagram of a digital signal processor configured in accordance with the prior art.
Figure 2:
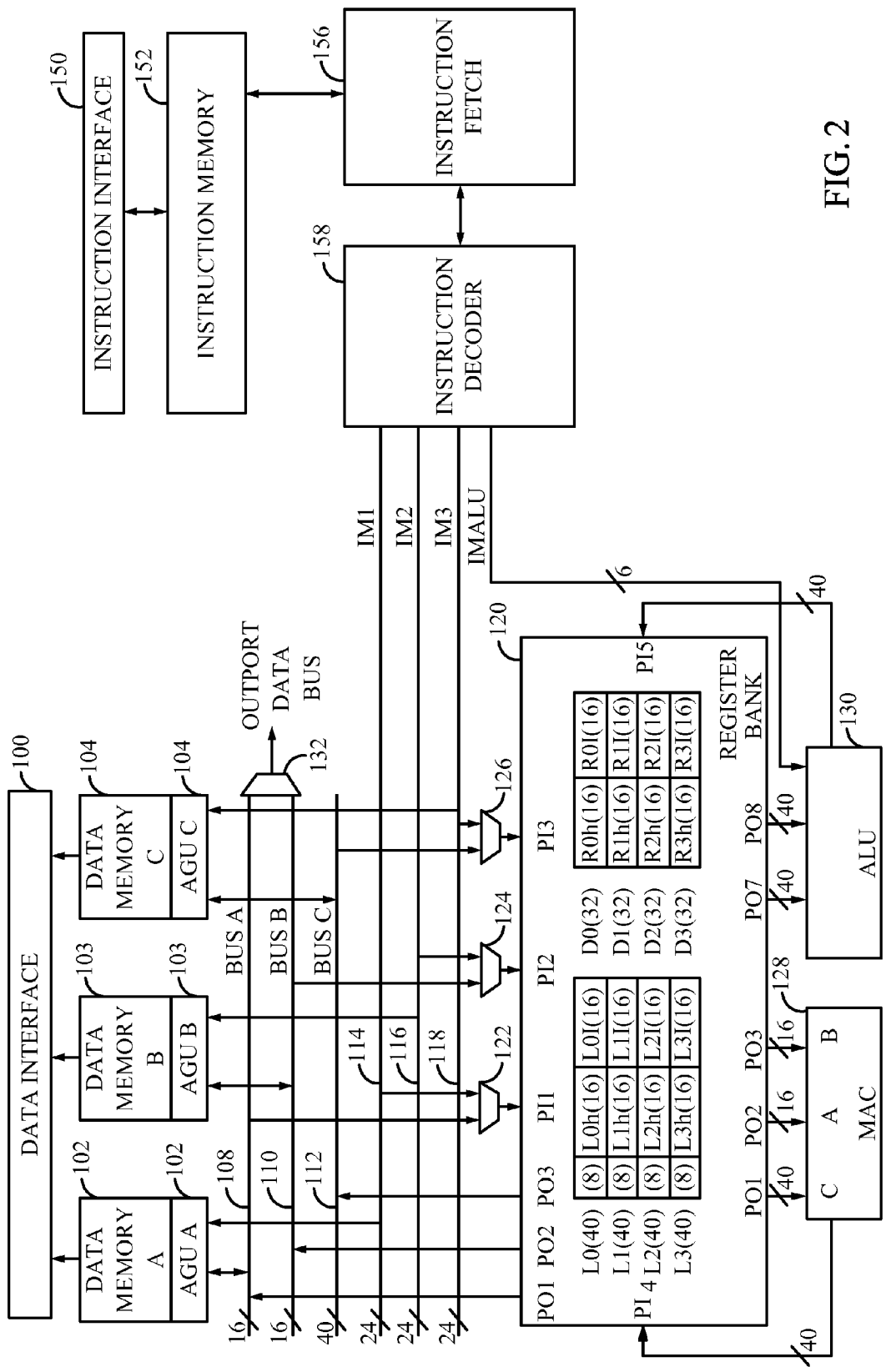
FIG. 2 is a block diagram of a digital signal processor configured in accordance with the present invention.

FIG. 2 is a block diagram of a portion of a digital signal processor (DSP) circuit configured in accordance with an exemplary embodiment of the invention. Data memories 102-104 are coupled to data buses A, B and C respectively via address generation units (AGU) 105-107, and to data interface 100. Data buses A, B and C are coupled to output ports PO1, PO2 and PO3 respectively of register bank 120, and to input ports PI1, PI2, and PI3 respectively of register bank 120 through multiplexers 122-126. Preferably, data buses A, B and C read and write data between data memories 102-104 and the registers within register bank 120.

The use of three data buses and three data memories allows more data to be exchanged between the register banks and the data memories without creating bus contention. For example, three fetch operations can be performed simultaneously from the three memories 102-104 using the three data buses A, B and C. Similarly, three write operations can be performed simultaneously, as can any combination of three fetch and write operations.

The addition of a fourth data bus would allow even greater numbers of operations to be performed, and is consistent with some embodiments of the invention. However, the use of only three data buses has particular advantages, because three buses facilitates performing many tasks commonly performed by a DSP such as filtering. Thus, the addition of a forth data bus does not provide the same incremental performance improvement as the addition of a third data bus, and requires the same amount of additional circuit area. Therefore, the addition of a forth data bus provides incrementally less benefit than the addition of a third bus. So, in many embodiments of the invention the use of only three data buses is preferred.

Output ports PO4, PO5 and PO6 or register bank 120 are coupled to multiply accumulate (MAC) unit 128, the output of which is in turn coupled to input port PI4 of register bank 120. Output ports PO7 and PO8 of register bank 120 are coupled to arithmetic logic unit (ALU) 130, the output of which is coupled to input port PI5 of register bank 120.

Instruction memory 152 is coupled to instruction fetch unit 156 and instruction interface 150. Instruction decoder 158 is coupled to instruction fetch unit 156, and to immediate bus Im1, immediate bus Im2 and immediate bus Im3, as well as immediate bus ImALU. Immediate buses Im1, Im2 and Im3 are coupled to multiplexers 122, 124 and 126. Immediate bus ImALU is coupled to ALU 130. In addition to the data couplings described above, decoder 158 is coupled to the various subsystems shown by control connections (not shown for ease of drawing).

Register bank 120 contains eight (8) registers labeled L0-L3 and D0-D3. Registers L0-L3 are forty (40) bit wide registers and can also be accessed in sixteen bit fragments via high word registers L0h-L3h and low word registers L0l-L3l. Registers D0-D3 are thirty-two (32) bits wide, and can be accessed in sixteen bit fragments via subregisters R0-R7. In general, the registers and subregisters are referred to as simply "registers," with the particular nature of the registers made apparent by the particular register number provided.

One aspect of the invention is realized by having some registers coupled to, and therefore accessible by, multiple input and output ports. In one embodiment, this multiconnectedness is provided by the use of multiplexers coupled to the input of each register, and to each output port. Other methods of providing multiconnectedness will be apparent, and are consistent with the use of some aspects of the present invention, including, e.g., using data buses and addressable memories. However, the use of multiplexers is preferred in some embodiments because they provide rapid and controllable access to the various registers and ports.

Other aspects of the invention are realized in embodiments of the invention that use immediate data buses, which is the case in the exemplary embodiment provided herein. For example, data contained in the instruction data can be read into register bank 120 without the need to interface with memories 102-105. Thus, the additional data can be provided from the instruction processing system without interfacing with the data memories, further reducing bus contention.

Figure 3:
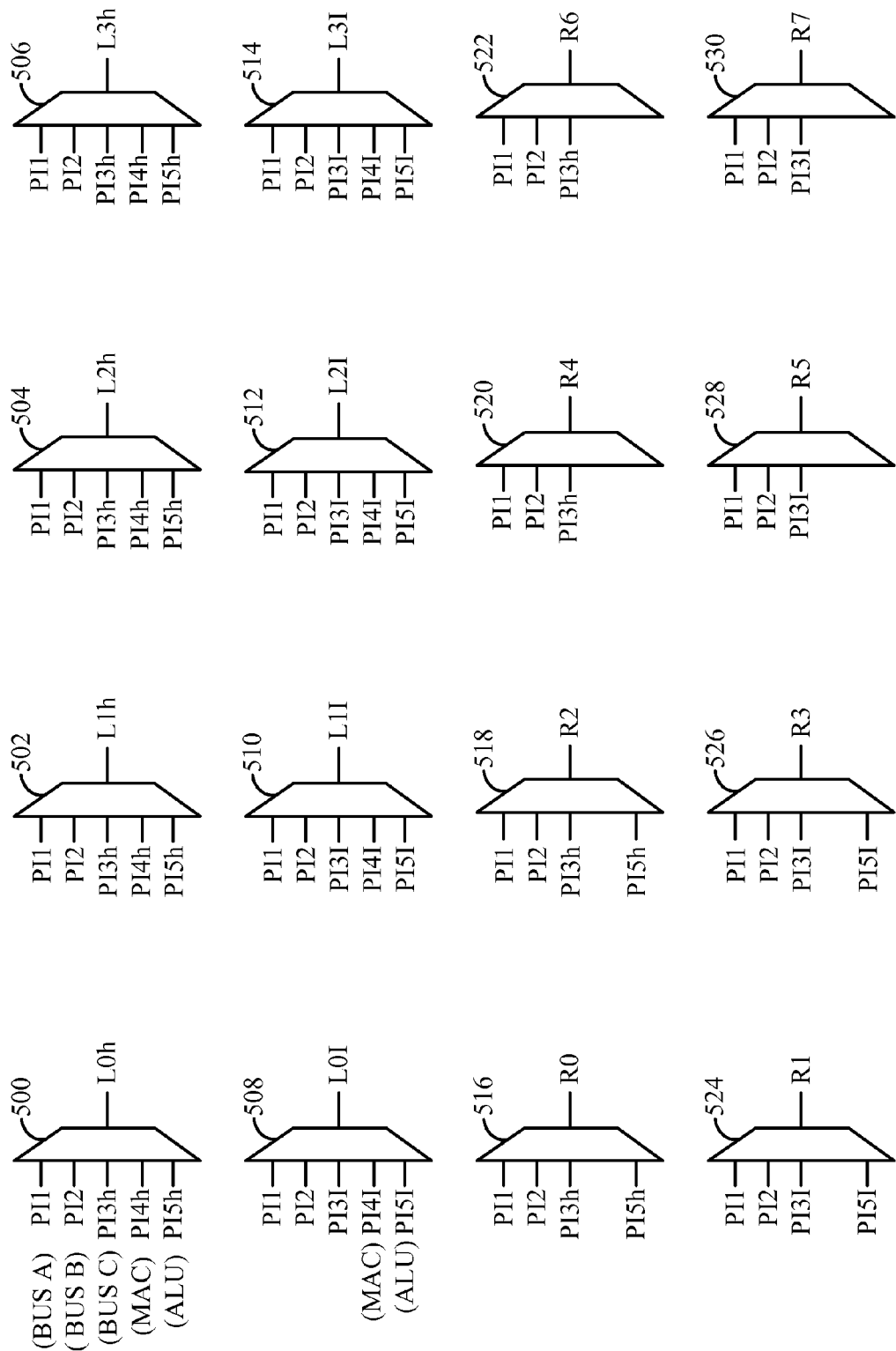
FIG. 3 is a block diagram of the connections between the input ports and the registers of the register bank.
Figure 4:
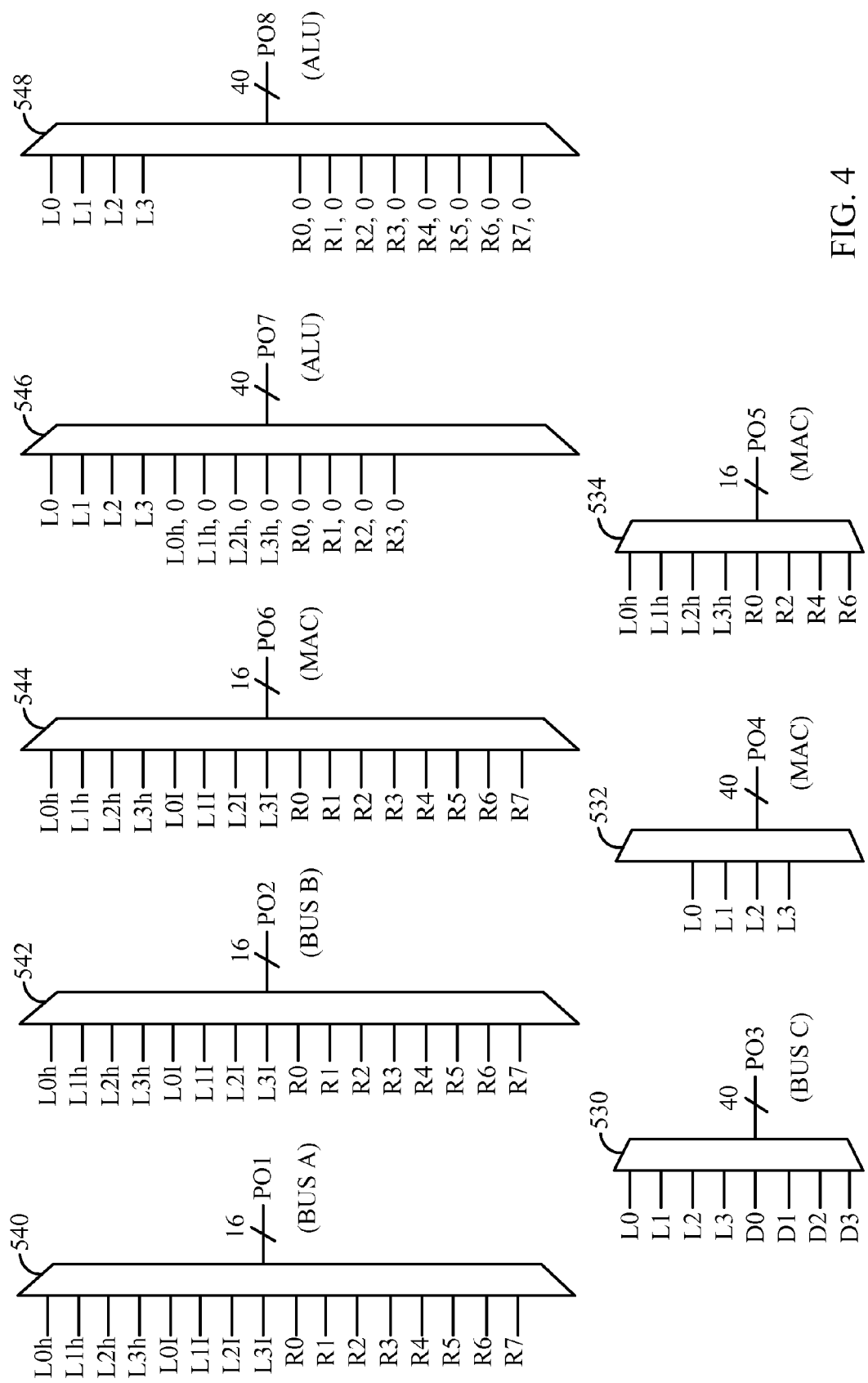
FIG. 4 is a block diagram of the connection between the register and the output ports of the register bank.

FIG. 3 is a block diagram illustrating the connections between the set of registers within register bank 120 and the set of input ports PI1-PI5. The registers are defined as L0h-L3h, L0l-L3l, and R0-R7. A register L0 is comprised of registers L0h and L0l. In the context of FIGS. 3 and 4, the registers L0h-L03 are 24 bits and registers and L0l-L31 and R0-R7 are 16 bits, making registers L0-L3 40 bits wide. Similarly, input ports PI3-PI5 are comprised of input ports PI3h-PI5h of 24 bits and PI31-PI51 of 16 bits for a total of 40 bits. The input ports PI1 and PI2 are only 16 bits, and when used to write to registers L0h-L3h, write only to the least significant 16 of the 24 bits available.

As shown in FIG. 3, some registers receive data from all the input ports, while other registers receive data from only some, or a portion, of the input ports. In particular, all of the registers L0-L3 receive data from all the input ports PI1-PI5, from multiplexers 500-514, with the 16 bit input ports being able to write to both the higher and lower registers within registers L0-L3. Thus, register L0-L3 receive input from any bus A-C (corresponding to input ports PI0-PI3) and from MAC unit 128 and ALU 130 (corresponding to input ports PI4 and PI5.) Registers R0-R7 receive input data from and bus A-C via multiplexers 516-530. However, none of registers R0-R7 receive input data from MAC unit 128 (input port PI4). Additionally, registers R0-R3 receive input data from ALU unit 130 via multiplexers 516, 518, 524 and 526.

The embodiment shown in FIG. 3 has various advantages. In particular, it provides sufficient connectivity between the input ports and registers to facilitate the most common operations, but the total connectivity is kept at a minimum to reduce the total circuit area required for implementing the circuit. For example, the output of MAC unit 128 is coupled only to long registers L0-L3. This is beneficial because the result of multiply and accumulate operations generally exceed 32 bits, so coupling the output of MAC unit 128 to registers D0-D3 provides minimal benefit. In another example, ALU unit 130 can output to registers L0-L3 and R0-R3. This enhances flexibility as data from ALU unit 130 may be written to a variety of registers, which is useful since ALU unit 13 performs a greater variety of operations making it useful to output data to a greater number of registers. However, ALU unit 130 is not coupled to all the registers, and therefore unnecessary and excessive connectivity is avoided.

FIG. 4 is a block diagram illustrating the coupling of the output ports of register bank 120 to the registers when performed in accordance with one embodiment of the invention. As shown, output port PO1, which outputs to BUS A, is coupled via multiplexer 540 to registers L0h-L3h, L0l-L3l and R0-R7, which comprises all the available registers when accessed as subregisters. Similarly, output port PO2, which outputs to BUS B, is coupled via multiplexer 542 to registers L0h-L3h, L0l-L3l and R0-R7. Output port PO3, which outputs to 40 bit wide BUS C, is coupled by multiplexer 530 to registers L0-L3 and D0-D3, which comprises all of the available registers when accessed as full registers.

Output port PO4, which is coupled to the 40 bit input of MAC unit 128, is coupled via multiplexer 532 to registers L0-L3. Since the values accumulated by MAC 128 tend to be large due to the nature of the multiply and accumulate operations performed, coupling output port PO4 to only the 40 bit "long" registers L0-L3 provides an optimal coupling arrangement, because the utility derived from providing additional couplings to registers D0-D3 is low, given that the accumulation of various multiply operations will typically exceed 32 bits.

Output port PO5, which is coupled to one 16 bit input of MAC unit 128, is coupled by multiplexer 534 to registers L0h-L3h, R0, R2, R4 and R6. Output port PO6, which is coupled to the second 16 bit input port of MAC unit 128, is coupled to registers L0h-L3h, L0l-L3l and R0-R7. By coupling one sixteen bit input of MAC unit 128 to all the available registers, while coupling the second 16 bit input port to a subset of the available registers, a useful compromise is achieved. In particular, when register space becomes limited, at least one piece of data to be processed can be placed in any available register. However, by limiting the number of registers connected to the other input, the total amount of connection circuitry is reduced, which facilitates providing other functions and features, such as higher connectivity among the other registers, input ports, and output ports.

Output port PO7, which is coupled to an input of ALU 130, is coupled by multiplexer 546 to registers L0-L3, L0h-L3h and R0-R3, where L0h-L03h and R0-R3 are output in conjunction with a set of logic zeros. That is, registers L0h-L03h and R0-R3 are output to the bits 31-16 (bits numbered 0-39) bits of PO7, with bits 0-15 set to logic zero and bits 39-32 are sign extended using bit 31. Output port PO8, which is coupled to another input of ALU 130, is also coupled by multiplexer 548 to registers L0-L3, and registers R0-R7 in conjunction with a set of logic zeros. Coupling the inputs of ALU 130 in this manner allows logic operations to be performed on all the available long registers L0-L3, and therefore on large numbers, which is useful for many types of signal processing operations such as normalizing and scaling. Additionally, arithmetic operations can be performed between registers R0-R7 and L0h-L3h and R0-R7, which provides a high level of flexibility in terms of the set of registers that can be used, while also limiting the number of necessary connections, and therefore the required circuit area. It should be understood that the logical and arithmetic operations available are not limited to that described above.

The use of registers that are accessible by both the multiple data buses and the multiple processing units provides various advantages. For example, the registers provide an interface between the data buses and processing units, reducing the need to route each data bus to each processing unit. Reducing data bus routing same circuit area and reduces chip cost.

Furthermore, coupling as least some (a set) of registers to multiple processing units allows multiple operations to be performed on the same data using the multiple processing units, without having to read and write the data over the data bus and to the memory. This saves bus cycles and therefore reduces bus contention. Instruction processing pipelining is also facilitated because data processed by a first processing unit during a first instruction cycle may then be processed further by a second processing unit during a second processing cycle within the same register.

However, typically not all data will require processing by multiple processing units, so other registers (other set) are accessible by only one processing unit, or by fewer than the total number of processing units where more than two processing units are present. The use of this other set of registers reduces the number of connections, and therefore circuit area, and thus an optimal balance between register connectivity and circuit area (and therefore between performance and efficiency) is provided.

Furthermore, in one embodiment of the invention, pipelining is further enhanced by the use of two-phase clocked registers within register bank 128. The two-phase clocked registers are read on a first phase of the clock, and then written to on the second phase of the clock, within the same full clock ("processing") cycle. Thus during a particular processing cycle, data already processed by a first processing unit, such as the MAC 128, can be read out during the first clock phase and further processed by a second processing unit, such at ALU 130, within the remaining portion of the processing cycle.

Additionally, during the second phase of the processing cycle, new data just processed by the MAC 128 is written into the same register, thus allowing complete pipeline processing between two processing units during one processing cycle. Once again, these operations are performed without running the data over any of the internal busses, and therefore increased bus contention is avoided.

Referring again to FIG. 2, during operation, instruction fetch unit 156 retrieves binary instructions from instruction memory 152, or if not available in instruction memory 152, from a memory located externally. The external memory can take many forms well known in the art such as dynamic and static random access memory (DRAM and SRAM) or some derivative thereof, magnetic or optical hard disk memory or some other data storage medium well known in the art. In the exemplary embodiment of the invention, the instructions are of variable length and instruction fetch unit determines the length of the instruction and how much additional instruction data to fetch during each processing or clock cycle. Additionally, the instructions are stored in consecutive memory locations within the internal memory and external memory. The operation of fetch unit 156 and the storage of instruction data within memory and external memory are described in greater detail below.

Instruction decoder 158 receives the instructions retrieved by instruction fetch unit 156 and translates the instructions into control signals that are applied to one or more of the subsystems that make up the DSP including the data memories, register bank, MAC and ALU. Additionally, instruction decoder 158 may route immediate data that is contained within the receive instructions to the appropriate system via immediate buses Im1, Im2, Im3 or ImALU. Immediate data is typically numeric values stored within the instruction data that are used to perform operations on the data stored in data memories 102-106, or which may specify or modify an address.

Operations performed by the DSP of FIG. 2 include loading of data from a data memory into a register location via one of the data buses. Data may also be written from a register into a data memory. Also, MAC 128 or ALU 130 may perform operations on the data stored in one or more of the registers within register bank 120, where the results are typically written back into a register within register bank 120.

The DSP architecture described above provides numerous advantages. For example, the use of three data buses facilitates the uninterrupted pipeline processing of data. During an exemplary filtering performed by the DSP, the data to be filtered (signal data) is stored in one data memory and the coefficients to be applied to that data are stored in the other data memory. Storing the signal data and coefficient data in the two narrower memories is preferred, as the results of the operations typically require more bits than the operands. The coefficient and signal data are then read into register bank 120 and then multiplied and accumulated by MAC unit 128. The results of these operations may be stored in a second register within register bank 120, or overwritten into the register bank in which the input data was previously stored. Any results are then typically written from the register over the third bus (BUS C) into the wider (memory C) data memory.

Because the output data is written into a third memory via a third bus, and the input data sets are read from first and second data memories via first and second data buses, little or no memory access conflict or bus contention occurs. Thus, the processing of data may proceed uninterrupted, reducing the need to clock any of the memory subsystems or data buses at higher rates than the internal buses or other subsystems. This reduces power consumption while maintaining, or increasing, processing speed.

Additionally, running the data through the DSP without interruption facilitates pipelined processing of the data where a number of different data values are processed differently at different stages within the DSP at any given time. Also, when combined with the use of parallel instructions as described below, significant processing flexibility can be achieved in combination with this efficient highly pipelined processing, thus providing a highly versatile, efficient and powerful DSP system.

It should be understood that the use of multiple buses increases the ability to move data around the DSP in a variety of additional ways that reduce bus conflict. For example, data to be divided may be supplied as input data from memory C via data bus C, with the divisor supplied by another memory and bus, such as memory A and data bus A. The result can then be stored in the remaining memory (memory B) by way of the remaining bus (data bus B).

In another exemplary operation facilitated by providing multiple data buses and memories, data to be accumulated by MAC unit 130 is provided via a first memory and first bus (for example memory A and data bus A). After a set of accumulations are performed, the resulting data may be written to memory C via data bus C. Simultaneously, data to be logically shifted is provided from memory C via data bus C to ALU unit 130 during the processing cycles where data bus C is not carrying result data from MAC unit 128, which is most of the time such result data will only be available after a set of accumulate operations are performed. The logically shifted data is simultaneously written to memory B via data bus B. Thus, the use of multiple data buses and memories in general, and particularly in conjunction with multiple processing units, facilitates performing multiple operations by providing more possibilities for moving data within the DSP.

As noted above, another aspect of the invention is realized by the use of registers that are accessible by the multiple processing units, e.g., MAC unit 128 and ALU unit 130. Registers accessible by multiple processing units allow data that must be processed by the processing units to be accessed without moving the data across any of the internal data buses. For example, data can be written to a register by a first processing unit, and then further processed by the second processing unit which may also access that register. This further relieves bus contention and congestion, and therefore maintains high data throughput.

Additionally, when combined with the use of parallel operation instructions, and parallel processing capability, as described in greater detail below, the ability to perform highly pipelined, multi-operation, processing of data is further enhanced. In contrast, typical pipelining involves staggering the different phases (i.e. fetch, decode, process) of a set of operations so that the processing time between the start of each instruction is reduced. Multi-operation pipelining provides the additional benefit of having data pass through a set of different operations, where those operations are performed simultaneously on different data sets. This multi-operation pipelining increases the number of instructions performed per processing cycle beyond the conventional instruction pipelining.

The synergy of the above described architecture is further illustrated by the following exemplary processing. In an exemplary filtering operation (as also described above), results generated by MAC 26 increases in size (both in terms of absolute value and the number of bits used to represent the value) as the number of products over which accumulation is performed grows. Eventually, the result will have to be scaled, or "normalized," which typically calls for a logical shift operation by ALU unit 130.

In the described system, the scaling operation can be performed simultaneously with the multiply and accumulate operations of the filtering. During a processing cycle in which such simultaneous processing is performed, unprocessed signal data and filtering coefficients are read from data memories 102 and 103 into registers within register bank 120 (for example L0h and L0l). Simultaneously, MAC unit 128 reads the values previously stored in those registers (L0h and L0l) and performs a multiply and accumulate operation where the output is written to a second register (for example L1). Also simultaneously, ALU unit 130 reads the data previously stored in the second register (L1) and performs the scale operation writing the scaled value to a third register (for example L2). Also during the same processing cycle, the previous value stored in the third register (D0) is written into data memory 104 using bus C 112. As should be apparent, the particular operations may vary in accordance with the particular task being performed. As should also be apparent, the use of highly parallel instruction that permit multiple operations to be performed further facilitates highly pipelined multi-instruction operations. The highly parallel instructions allow specification of the different operations to be pipelined during each processing cycle Using the two-phase read-write operations, an example of which is provided above, this processing can all be done during a single processing cycle, where the data is read out from each register during the first clock phase, processed by the processing units, and the results written over the old data into the register during the second clock phase. It should be understood, that the same value is not subjected to all the steps in this process during a single clock cycle, but rather a set of values are pipelined through the DSP, each moving to the next step as the processing is performed.

Many other operations are facilitated by the various aspects of the invention described herein. For example, vocoding is the process of coding voice data. Vocoding requires many different types of operations to be performed, some of which can be performed independently, and therefore simultaneously. The use of multiple data buses and multiple processing units facilitates performing these operations.

Further advantages are provided from the use of a separate instruction memory and instruction decode. For example, simultaneous with the data processing described above, instructions are read from instruction memory 152 by instruction fetch 156, which in turn causes instruction decoder 158 to generate control signals to control the operation of the various other subsystems within the DSP (connections not shown for clarity and ease of drawing). Once again, the data buses do not have to carry instruction data, and therefore the signal data may be moved and processed without interruption from the instruction data. Thus, performance is further enhanced by separating the instruction processing from the data processing, which eliminates the need to consume data bus cycles for instruction data movement.

Figure 5:
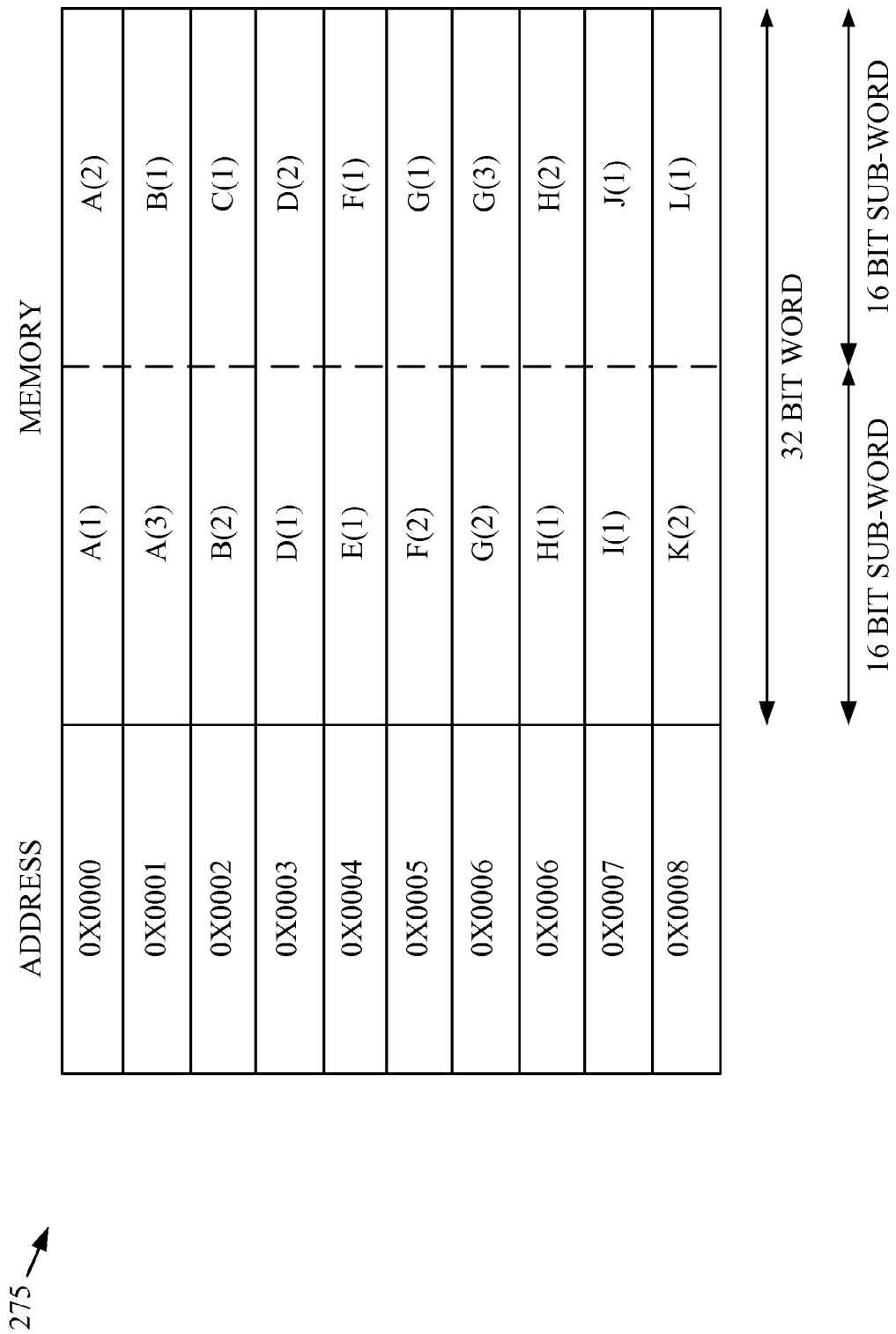
FIG. 5 is a diagram of a set of variable length instruction stored in memory space in accordance with one embodiment of the invention.

FIG. 5. is a table illustrating the packing of a set of variable length instructions within a portion of the addressable memory space of instruction memory 152 of FIG. 2 in accordance with one embodiment of the invention. In some embodiments of the invention the variable length instructions may also be stored as shown in FIG. 2 within the external memory system to realize additional memory efficiencies. Example addresses are shown in the left column, with each address pointing to a 32-bit data word, shown in the middle and right columns of memory 275. The middle column represents a 16 bit high order subword and the right most column represents a sixteen bit low order subword of each data word. The high and low order subwords are not individually addressable in the preferred embodiment of the invention in order to reduce the amount of necessary address logic.

Within memory 275, variable length instructions A-L are stored in the packed configuration shown. Instruction A is a 48 bit instruction with the first two double-bytes A(1) and A(2) stored in address word 0x000 and the third double-byte A(3) stored in the high order subword of address 0x001. Instruction B, which follows instruction A, is a 32 bit instruction with the first double-byte B(1) stored in the low order word of address 0x001 and the second double-byte B(2) stored in the high order subword of address 0x002. Instruction C is a 16 bit instruction with the first and only double-byte C(1) stored in the low order subword of address 0x002.

As should be apparent from the storage location of instructions A-C, the present invention reduces the size or amount of memory 275 necessary to store a set of instructions by storing portions of different instructions within the same address word. For example, the third double-byte A(3) of instruction A is stored along with the first double-byte B(1) of instruction B.

FIG. 5 shows a dotted line between third double-byte A(3) of instruction A and first double-byte B(1) of instruction B. This dotted line represents the back edge instruction boundary of instruction A, and also represents the front edge instruction boundary of instruction B. It should be noted that this instruction boundary falls in the interior of word 0x001, and many instruction boundaries will fall in the interior of words. However, it should also be noted that this is not mandatory. For example, the instruction boundary between instructions D and E (back edge instruction boundary of instruction D; also front edge instruction boundary of instruction E) is also the word boundary between words 0x003 and 0x004 (back edge instruction boundary of word 0x003; also front edge instruction boundary of 0x004). It is thus seen that every instruction has two instruction boundaries, a front edge instruction boundary and a back edge instruction boundary. Similarly, every word has two word boundaries, a front edge word boundary and a back edge word boundary. It is an important feature of the present invention that the instructions may be divided into two portions. In the first portion of instructions, each instruction has at least one instruction boundary (front edge or back edge) which corresponds to a word boundary (front edge or back edge). In the second portion of instructions (for example, instruction B), the instruction boundaries (both front edge and back edge) of each instruction do not correspond to a word boundary (front edge or back edge); that is, they are different from any word boundary.

By storing variable length instructions across word boundaries, or more particularly in consecutive locations within the memory address space, the present invention reduces the amount of instruction memory required to store a given number of instructions. Reducing the amount of instruction memory reduces the size and cost of the die necessary to give the DSP a given amount of instruction caching capability. The packing of instructions is further illustrated by placement of variable length instructions D-L within memory 275 as shown in FIG. 3.

It should be understood that packing all the instructions in consecutive locations, as described above, is not necessary in some embodiments of the invention. For example, different embodiments of the invention pack only a substantial portion (e.g. 90% or more) of the instructions in consecutive locations within memory space. In other embodiment of the invention, only a significant portion (e.g. between 25 to 50%) of the instructions are advantageously packed in consecutive memory space. Other embodiments of the invention may use still other percentages of packed instructions.

Also, the use of consecutive locations is not necessary. The instructions must simply be placed in a total memory space that is not substantially larger than the total amount of instruction data. This is preferably achieved by placing the instructions in adjacent locations within memory space, however, the instructions could be shuffled throughout memory space, so long as the instruction could be read out in intended order of execution. Those skilled in the art will recognize that this type of predetermined shuffling as a remapping of memory space, and that such remapping typically does not affect the operation of the invention, other than by adding generally undesirable complexity.

Similarly, it is preferable to have the packing scheme employed over a large set of instructions. For example, employing the packing scheme over at least ten instructions is preferred in some embodiments of the invention.

Additionally, the particular packing scheme used in the exemplary embodiment of the invention is not necessary in some other embodiments of the invention. For example, some other embodiments of the invention may not have instructions in consecutive memory locations. Rather, instructions may separated by some small amount of memory space, including the use of an instruction separator code. Preferably, the small amount of memory space is less than the amount of memory space necessary to keep instruction boundaries on memory word boundaries. The above described packing is preferred in many instances, however, due to its simplicity, completeness and efficiency. In general, the chosen tradeoff between the completeness of packing and the complexity of the packing scheme can differ in different embodiments of the invention.

Also, as implied above, some embodiments of the invention employ the packing scheme on only portions of the instructions, but not the entire set of available instructions. For example, instruction packing may be performed only on sets of instructions which are used to perform a particular task or subroutine.

It should be noted that combining highly packed instruction storage with the use of variable length instructions further reduces the memory requirements of the DSP, because variable length instructions only consume the amount of data necessary to request the desired operations, and highly packed instruction storage keeps the total memory equal to that consumed by the set of variable length instructions, and therefore at a minimum. Reduced memory size reduces chip size and cost.

In addition to the benefit of reduced DSP size, and therefore reduced DSP cost, the use of highly packed instructions and variable length instructions provides additional unexpected advantages when combined with other features of the architecture described above. For example, by reducing the size of instruction memory, additional circuit area is made available for the use of three data buses within the DSP, which provides the benefits as described above, including uninterrupted, highly pipelined, data processing, and the ability to perform multiple operations simultaneously within the DSP. Thus, tightly packed instructions combines with the multibus architecture to provide the additional, unexpected, benefits of increased performance and efficiency.

Figure 6:
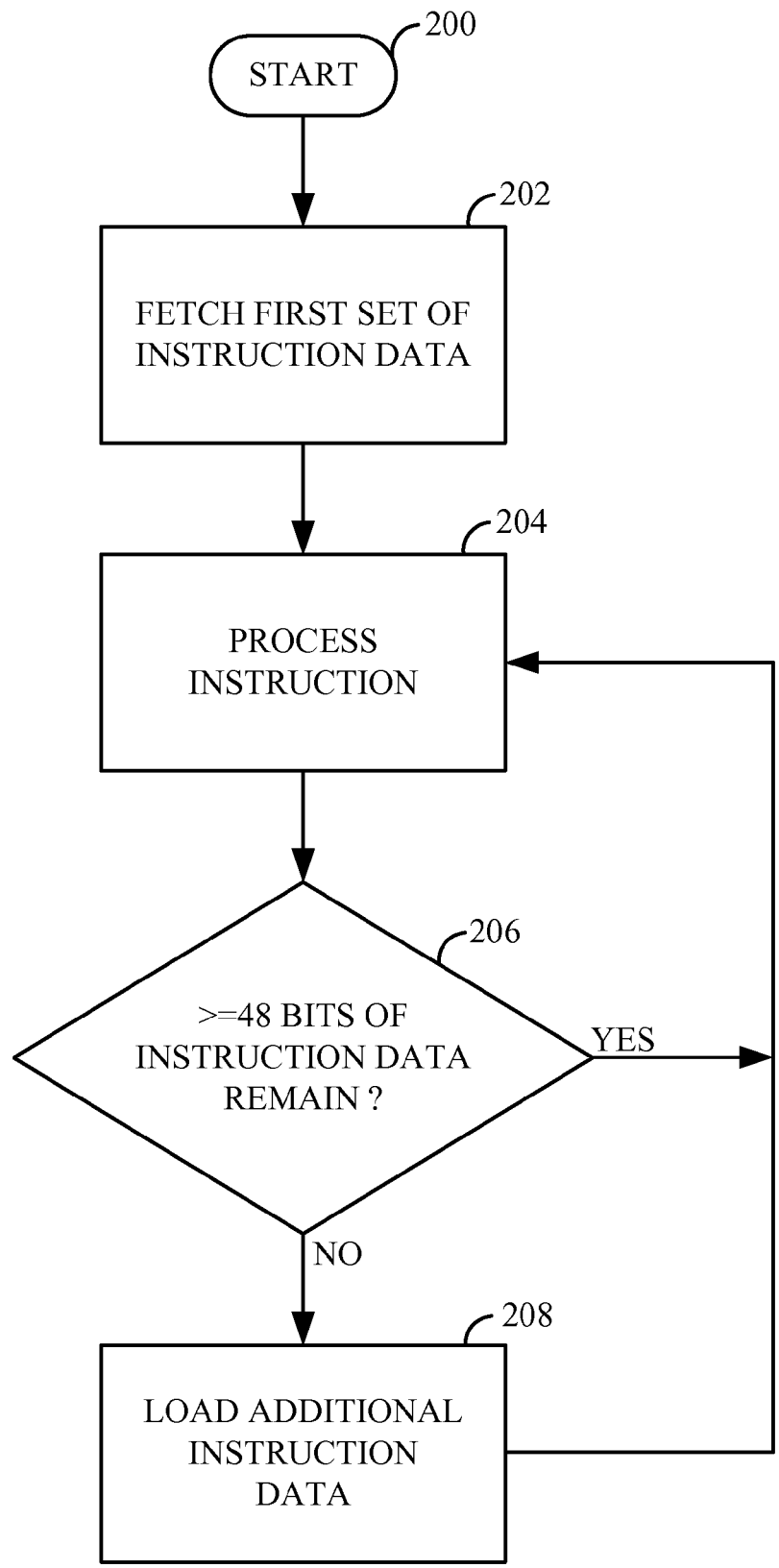
FIG. 6 is a flow chart illustrating the operation of the instruction fetch unit.

The ability to store variable length instructions within consecutive locations of memory space is also made possible by providing a DSP that can fetch and process variable length instructions stored in such a configuration. FIG. 6 is a flow diagram of the operation of instruction fetch unit 156 when fetching instructions from instruction memory 152 in accordance with one embodiment of the invention. The processing begins at step 200 and at step 202 a first set of instruction data is read from instruction memory 152. In the exemplary embodiment of the invention, two 32 bit words, or 64 bits, of instruction data are retrieved at step 202.

At step 204 the first instruction contained in the 64 bits of retrieved instruction data is processed by instruction decoder 158. In the exemplary embodiment of the invention, the instruction may be 16, 32 or 48 bits long. The instruction length is determined by a set of header bits contained in each instruction which indicate the instruction length as described in greater detail below. Various other methods for specifying instruction length should be apparent including the use of codes that demarcate and separate two instructions, or the use of a super header instruction, which specifies the length of some set of instructions which are to follow. The use of header bits is preferred in some instances because the instruction length information is kept in close proximity to the instruction, thereby reducing the need to store or maintain state information about the instruction processing.

After the first instruction contained within the 64 bits of retrieved instruction data is processed, it is determined at step 206 if 48 bits or more unprocessed instruction data remain in the 64 bits of retrieved instruction data. If 48 bits or more unprocessed instruction data remains, the next instruction contained in the remaining 48 bits of unprocessed data is processed again at step 204.

If less that 48 bits of unprocessed instruction data remain in the retrieved instruction data at step 206, additional instruction data is loaded from instruction memory 152. Various methods for loading additional instructions are contemplated. In one embodiment of the invention, sufficient additional instruction data is loaded from the instruction memory to return the amount of unprocessed data stored in the instruction fetch unit to 48 bits. Ensuring the 48 bits of unprocessed data are stored within the instruction fetch unit ensures that at least one compete instruction is available to instruction decoder 158.

In a preferred embodiment of the invention, instruction fetch unit retrieves a variable amount of data when less than 48 bits of unprocessed data remains depending on the particular amount of data that has been processed. In particular, if the amount of data processed is equal to or exceeds a data word (32 bits), an additional data word (32 bits) of new instruction data is retrieved. If the amount of data previously processed is equal to or exceeds two data words (64) bits, two new data words are retrieved by instruction fetch unit.

Determining the amount of data retrieved based on the number of words of data processed is preferred, because it keeps a sufficient amount of unprocessed data available to instruction decoder 158 while also allowing more efficient word-length access to the memory banks that make up the instruction memory. Once additional unprocessed instruction data is retrieved at step 206, the next instruction is processed within the total amount of unprocessed instruction data now available.

Figure 7:
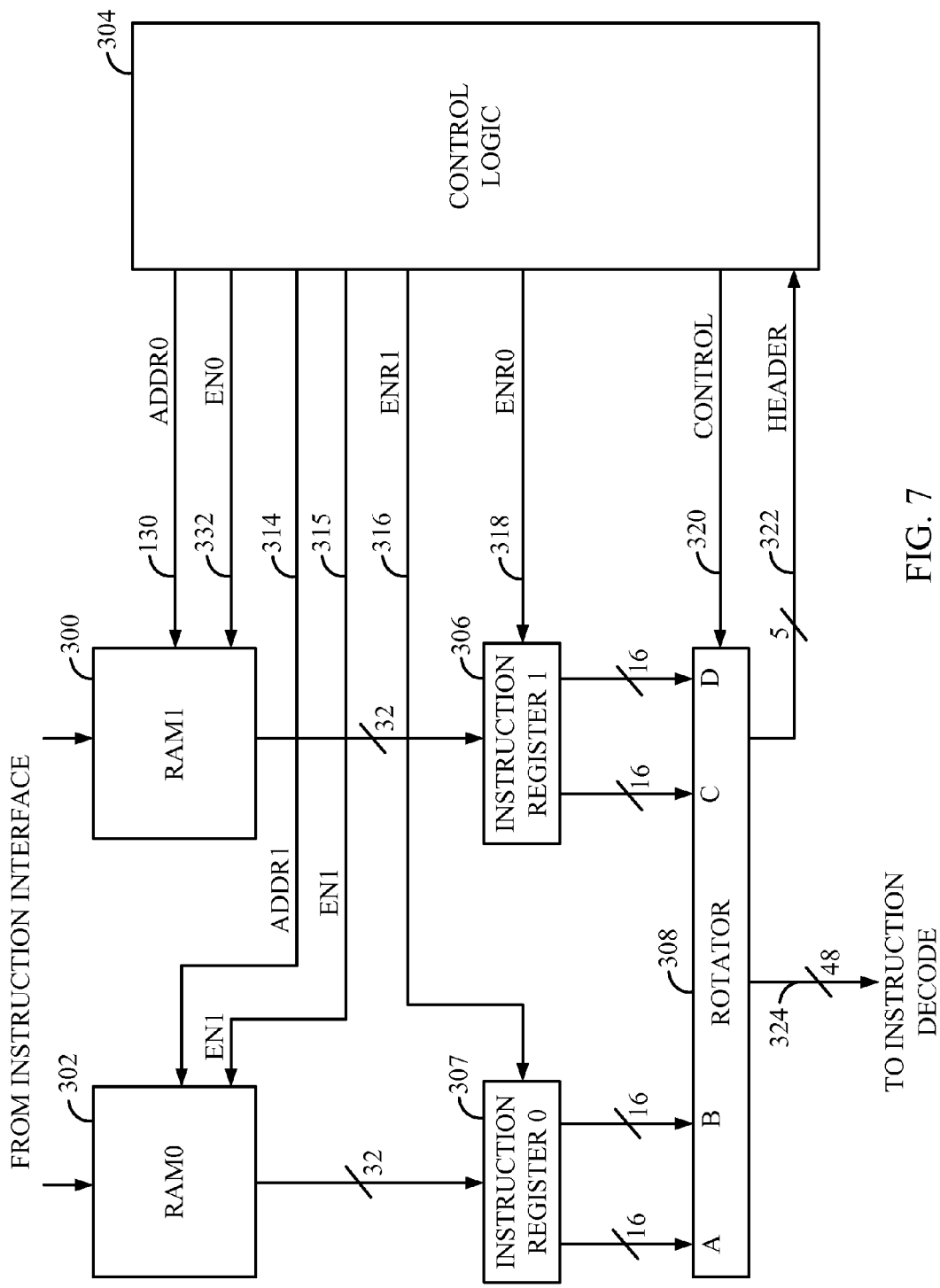
FIG. 7 is a block diagram of the instruction fetch unit when configured in accordance with one embodiment of the invention.

FIG. 7 is a block diagram of instruction fetch unit 156 and instruction memory 152 configured in accordance with one embodiment of the invention. Instruction memory 152 is comprised of even memory bank 302 (RAM0) and odd memory bank 300 (RAM1) each of which reads and writes 32-bit data words. The memory banks are labeled even and odd because they both are addressed within the same address space, but even addresses are directed to even memory bank 302 and odd addresses are directed to odd memory bank 300.

Memory banks that read and write other word sizes including 8, 16, 24, 48 and 64 bits words may be used in alternative embodiments of the invention. Additionally different numbers of memory banks may be used including 1-8 memory banks. The use of two memory banks with 32-bits words, however, is preferred because it reduces the overall complexity while also allowing instruction data to be addressed in manageable chunks.

Control logic 304 causes data words to be read from memory banks 300 and 302 to instruction registers 106 and 107. The particular memory locations read are specified by address lines 310 and 314 and the reading of the instruction is controlled by enable lines 332, 315, 316 and 318. The 32 bit outputs of instruction registers 306 and 307 are applied in 16 bit portions to inputs A, B, C and D of rotator 308. Rotator 308 outputs 48 bits of instruction data 324. The 48 bits of instruction data 324 are comprised of three of the four (3:4) inputs A, B, C and D with each input set containing 16 bits, as described in greater detail below.

During operation, control logic 304 loads instruction data from instruction memory banks 300 and 302 in accordance with the method described with reference to FIG. 5. In particular, control logic 304 first loads a total of 64 bits of unprocessed instruction data into instruction registers 306 and 307 by reading a 32 data word from both even memory bank 302 and odd memory bank 300. If a 16 bit instruction is processed, no new data is loaded because instruction registers 306 and 307 still contain 48 bits of unprocessed instruction data. If a 32 bit instruction is then processed, instruction register 306 is loaded with a 32 bit word of additional instruction data because less than 48 bits of unprocessed instruction data remains. Loading the 32 bit instruction word, once again, places 48 bits of unprocessed instruction data in registers 306 and 307, with 16 unprocessed bits in register 307 and the next 32 in register 306. If a 48 bit instruction is then processed, no unprocessed instruction data remains, so both registers 306 and 307 are loaded with 32 bit words of instruction data, which is 64 bit of unprocessed instruction data, which is greater than the necessary 48 bits of instruction data. While loading a full 64 bits of instruction data is not particularly necessary, it is useful because it allows the use of two 32-bit word instruction memories and registers, which are common in the industry. The use of other methods of maintaining sufficient amounts of unprocessed instruction data is consistent with the use of some aspects of the present invention.

Once 64 bits of new instruction data is loaded into instruction registers 306 and 307, control logic 304 further configures rotator 308 using control signals 320 to output the next 48 next bits of instruction data received on inputs A, B, C and D based on 1) the location of the instruction data within the instruction address space, 2) the set of instruction data that has been processed, and 3) the length of the previous instruction processed. In particular, rotator 308 is configured to output the set of 48 bits of instruction data next-in-line to be processed with the next-in-line bits of that instruction data in the most significant, or leftmost, position.

For example, upon loading the first two words, or 64 bits, of instruction data into registers 306 and 307, if the instruction data in the even instruction register 307 is next-in-line, the output of rotator 308 is comprised of the instruction data received on input A, B and C (ABC) in that order. If the instruction data in the odd instruction register 306 is next-in-line, rotator 308 is configured to output the instruction data received on inputs C, D and A (CDA) in that order.

As instructions are processed, new instruction data is loaded into data registers 306 and 307 as described above, and rotator 307 is configured to continue to output the next-in-line instruction data on output 324 based on the size of the previous instruction processed. The size of the previous instruction processed is conveyed to control logic 304 by header data 322, which is a copy of the first five bits of output 324. As noted above, any predetermined method for specifying the instruction length to control logic 304 is consistent with the practice of the present invention, although the use of the first five bits is preferred because it allows the instruction length to be determined directly from the instruction data.

In an exemplary embodiment of the invention, the size of the previous instruction is coded into two bits of state information I1 and I0 in accordance with Table 1.

TABLE 1

| Full instruction formats. | | |
|---|---|---|
| I1 | I0 | Instruction Size |
| 0 | 0 | Branch/Stall/Reset |
| 0 | 1 | 16-bit |
| 1 | 0 | 32-bit |
| 1 | 1 | 48-bit |

Additionally, the configuration of rotator 308 is controlled by two select bits S1 and S0 that make up control 320 which are coded as set forth in Table 2.

TABLE 2

Rotator select control bits and output.

| S1 | S0 | Rotator Output |
|----|----|----------------|
| 0  | 0  | A B C          |
| 0  | 1  | B C D          |
| 1  | 0  | C D A          |
| 1  | 1  | D A B          |

As should be apparent, as the state of S1 and S0 is incremented, the output of rotator 308 is left-rotated, or barrel-shifted. The left-rotation is such that each input group (A, B, C and D) is shifted to the left on the output. The input group that was at the left most position of the output is removed. The input group previously not asserted at the output is subsequently output at the rightmost position.

The state of S1 and S0, and therefore the configuration of rotator 308, is updated, or rotated, by an amount that varies in response to instructions of various length. It particular, the value (I1 I0), representing the length of the instruction being processed, is added to the control bits S1 and S0, and any carry-out value is discarded. That is:

$$S1(t+1), S0(t+1) = S1(t), S0(t) + I0, I1 \quad (1)$$

For branch or reset condition the values of S1 and S0 are reset based on the particular instruction to which processing branches or resets, and therefore equation (1) is not utilized. Various methods for processing branch, reset and stall instructions are well known in the art, and because this processing is not particularly relevant to the invention, it is not described further.

In an exemplary processing, rotator 308 begins with an output of ABC, and select bits S1 and S0 at 00. If a 16-bit instruction is received, the corresponding instruction length bits of I1 and I0 of 01 are added to S1 and S0 yielding a S1 and S0 of 01, which corresponds to an output 324 from rotator 308 of BCD. An output of BCD is the next-in-line set of instruction data after the first 16-bits of instruction data (input A) have been processed.

If the next instruction is a 32-bit instruction, an instruction length I1 and I0 of 10 is added to the current S1 and S0 state of 01 yielding 11. The resulting output is DAB, which corresponds to the next 48-bits of instruction data that have not been processed, configured with the next-in-line instruction data received on input D positioned in the most significant, or left most, position. Previously, the instruction data from inputs B and C had been processed. It should be noted that during the processing of the previous 32-bit instruction new data is loaded into instruction register 307 in accordance with the instruction data loaded process described above.

If a 48 bit instruction is then processed, the state of the select bits S1 and S0 is increased by an instruction length I1 and I0 of 11, which yields an S1 and S0 of 10, discarding the carryout, which configures rotator 308 to output CDA. An output of CDA corresponds to the next 48 bits of instruction data to be processed, with the next-in-line bits configured in the most significant position. Previously the instruction data on input D, A and B was processed. It is once again noted that new instruction data is read into register 306 during the processing of the previous instruction. The logic described above to perform the associated instruction data processing is provided for purposes of example, and the use of other logic to perform the above described instruction data processing will be apparent and is consistent with the use of the invention.

Thus, in the exemplary embodiment, control logic configures rotator 308 to output the next 48 bits of instruction data received from instruction registers 306 and 307 with the next instruction bits to be processed located in the left most position. Those skilled in the art will recognize that presenting the instruction data to instruction processing unit 158 in any predetermined arrangement whereby the next set of instruction data to be processed is identifiable is also consistent with the use of the invention.

As noted above, in addition to outputting the next 48 bits of unprocessed instruction data, rotator 308 also indicates the size of the next instruction to be processed to control logic 304. In particular, rotator 308 outputs an additional copy of the next 5 bits of instruction data to be processed to control logic 304. In the preferred embodiment of the invention, the length of the instruction is specified by the first five (5) bits of the instruction.

Figure 8:
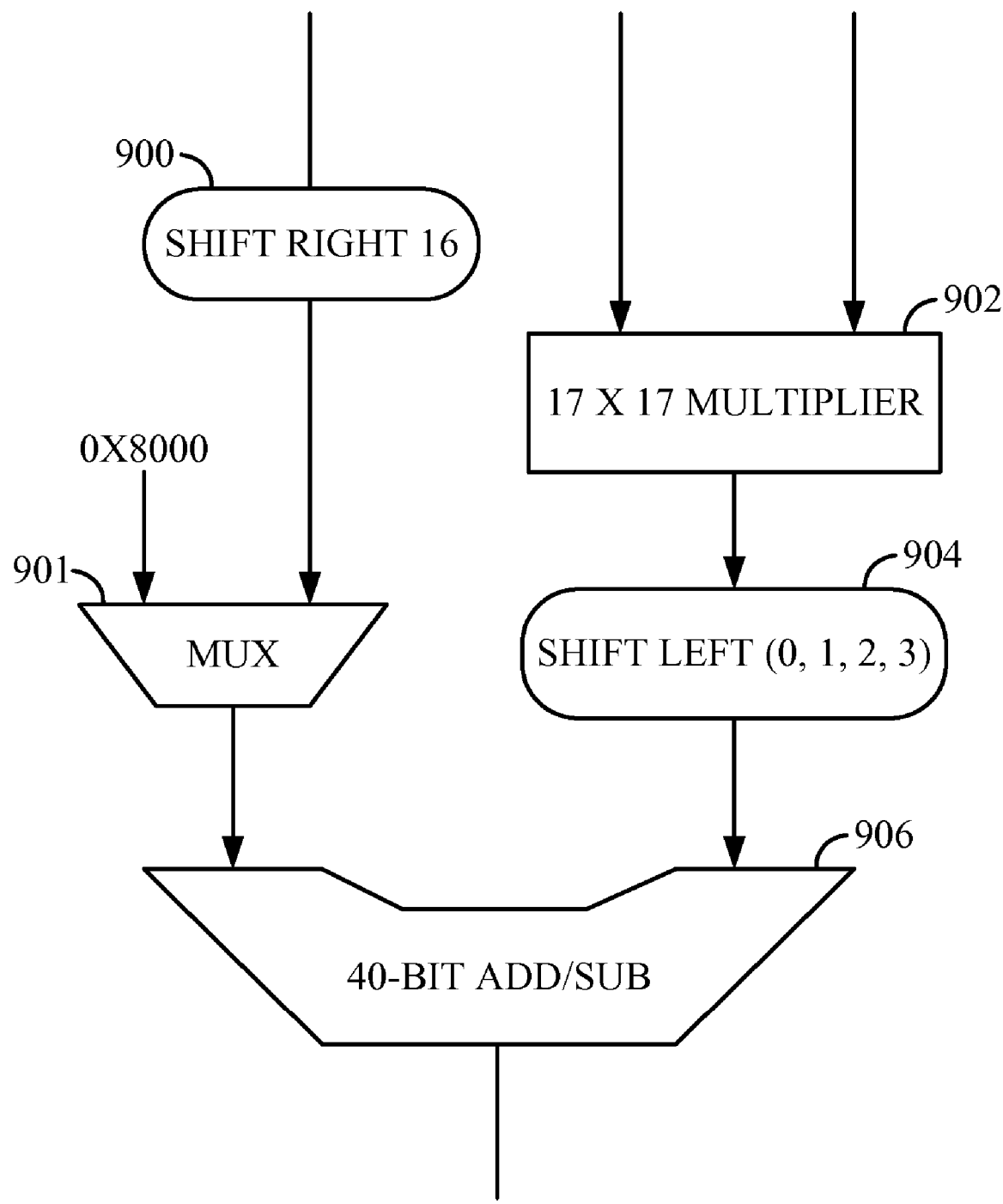
FIG. 8 is a block diagram of the MAC unit when configured in accordance with one embodiment of the invention.

FIG. 8 is a block diagram of MAC unit 128 when configured in accordance with one embodiment of the invention. Shift right 900 receives the 40-bit input to be accumulate and shifts the value by either 0 or 16 bits, with the output applied to one input of multiplexer 901. The other input of multiplexer 901 receives the value 0×8000. Multiplier 902 receives two 16 bits values to be multiplied along with sign bits from instruction decode 158 for a total of 17-bits for each input.

The output of multiplier 902 is received by shift left 904, which shifts the output by 0, 1, 2 or 3 bits as specified by instruction decode 158. Adder/subtractor 906 receives the output of multiplexer 901 and shift left 904. Adder/subtractor 906 performs addition or subtraction of the two input values as instructed by instruction decoder 158 and outputs the result, which is applied to register bank input port PI4 in the exemplary embodiment of the invention.

The use of a shift right 16 unit 900 within MAC unit 128 in some embodiments of the invention provides additional utility over other types of MAC units. More specifically, the use of the shift right 16 unit 900 facilitates performing double precision operations in a reduced number of clock cycles. For example, to perform a double precision operation in which a 32 bit number (A) is multiplied with a 16 bits number (B), the low 16 bits (Al) of the 32 bit number are first multiplied with the 16 bit number B during a first clock cycle, yielding an intermediate value I that is stored in register bank 120.

During a second clock cycle the intermediate value I is input into right shift 16 unit 900 and shifted right by 16 bits. Additionally, the 16 bit number B and the high 16 bits of the 32 bit number A (Ah) are multiplied, and the result added with the right shifted intermediate value I from shift right 16 unit 900. Thus, a double precision multiply is performed in two clock cycles rather than three. In general, many double precision operations require one or more variables to be shifted relative to the other variables, and as such allowing the shifting step to be performing during the same clock cycle as one of the multiply or accumulate operation reduces the number of cycles necessary to perform the double precision operation.

Three clock cycles would normally be required because the first multiply operation, the shift operation, and the second multiply operation each typically require a clock cycle. Therefore, the use of the shift circuit reduces the number of clock cycles required to perform the double precision multiply. Other double precision operations involving differently sized operands are also facilitated by the use of shift right unit 900.

Instruction Configuration

A. Overview.

Figure 9:
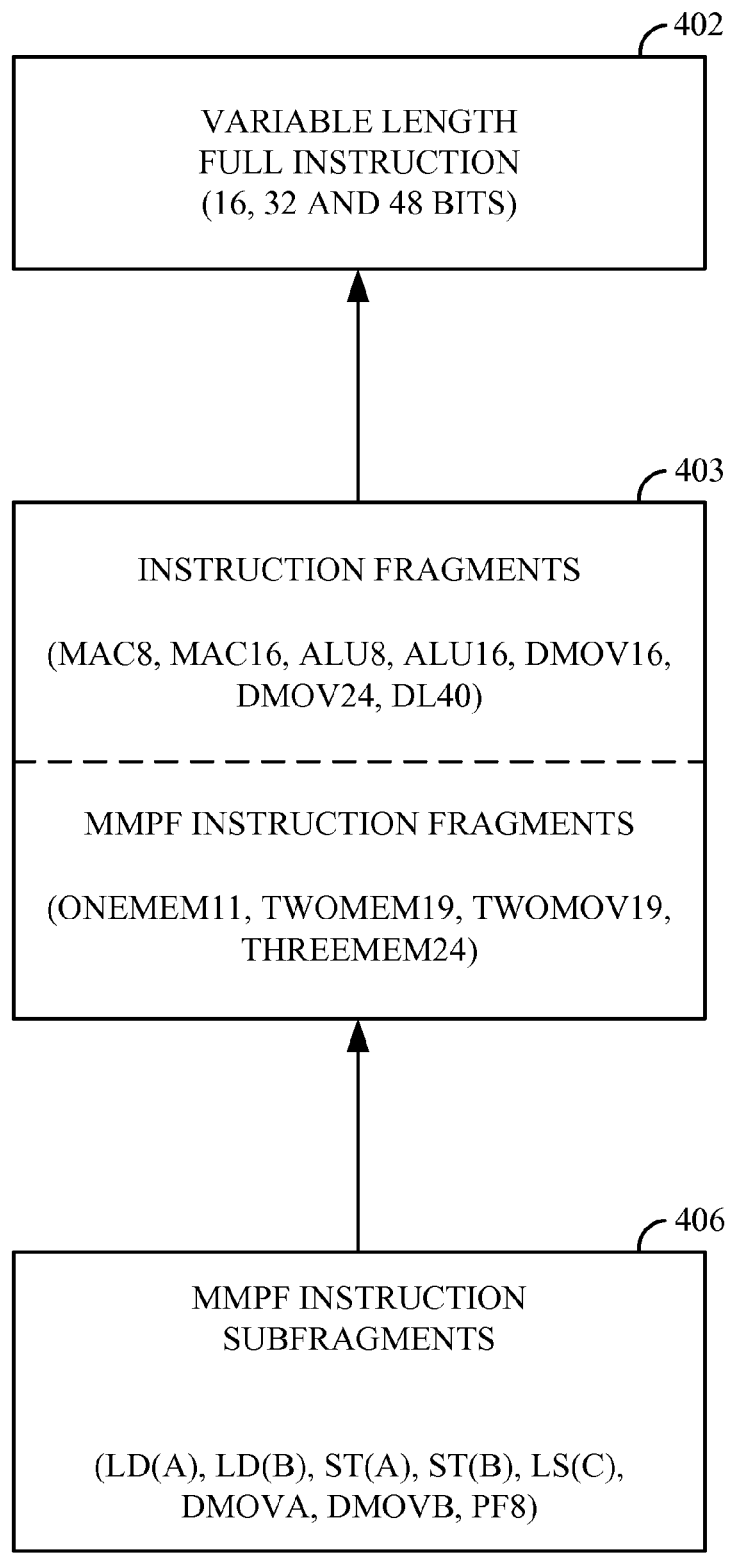
FIG. 9 is a block diagram of the instruction hierarchy used in one embodiment of the invention.

FIG. 9 is a block diagram illustrating the instruction hierarchy used in the exemplary embodiment of the invention. Block 402 shows the variable length full instructions comprised of 16, 32 or 48 bits which control the operation of the DSP. The variable length instructions are in turn made up of instruction fragments including general instruction fragments and memory move and program flow (MMPF) instructions as shown in block 403. The general instruction fragments used in the exemplary embodiment of the invention include MAC8, MAC16, ALU8, ALU16, DMOV16, DMOV24 and DL40 instruction fragments. The MMPF instruction fragments include OneMem11, TwoMem19, TwoMov19 and ThreeMem24 instruction fragments. The MMPF instruction fragments are made up of the MMPF instruction subfragments shown in block 406. The MMPF instruction subfragments include LD(A), LD(B), ST(A), ST(B), LS(C), DMOVA, DMOVB, and PF8. The various full instructions, instruction fragments and instruction subfragments are described in greater detail below.

B. Full Instructions.

In the preferred embodiment of the invention the DSP is controlled using full instructions having lengths of 16, 32 and 48 bits. The full instructions are in turn formed by combining one or more instruction fragments. The full instructions are configured to allow for consecutive storage within the instruction memory 152 and processing by the DSP. The format and configuration of the full instructions are described below, followed by the format and configuration of the instruction fragments. During operation, the DSP processes a full instruction each clock cycle. Thus, multiple operations can be performed during the processing of each full instruction, with particular operations determined by the particular set of instruction fragments selected.

The format of the three full instructions used in the exemplary embodiment of the invention are shown in Table 3.

TABLE 3

Full instruction formats.

| 43 | | 0 |
|---|---|---|
| Header | 43 Instruction Bits | |

| 27 | | 0 |
|---|---|---|
| Header | 27 Instruction Bits | |

| 11 | | 0 |
|---|---|---|
| Header | 11 Inst. bits | |

The five (5) bit header used for each full instruction indicates the length of the full instruction, and some additional information as to the contents of the full instruction. The format of the header used in the exemplary embodiment of the invention is provided in Table 4.

TABLE 4

Full instruction header formats.

| 5-bit Header | | | | | Instruction Length |
|---|---|---|---|---|---|
| 0 | 0 | 0 | 0 | X | 16-bit Instruction (2 types) |
| 0 | 0 | 0 | 1 | X | 32-bit Instruction (2 types) |
| 0 | 0 | 1 | X | X | 48-bit Instruction (4 types) |
| 0 | 1 | X | X | X | 32-bit Instruction (8 types) |
| 1 | X | X | X | X | 48-bit Instruction (16 types) |

Each full instruction (16, 32 and 48 bit long) contains one or more instruction fragments. Table 5 provides a list of the available instruction fragments in the exemplary embodiment of the invention. A more detailed description of the format and operation of the instruction fragments is provided after the discussion of the full instructions.

TABLE 5

Instruction fragments.

| Field | Explanation | Width |
|---|---|---|
| MAC8* | 8-bit MAC Operation | 8 |
| ALU8* | 8-bit ALU Operation | 8 |
| OneMem11* | One Memory Operation | 11 |
| MAC16* | 16-bit MAC Operation | 16 |
| ALU16* | 16-bit ALU Operation | 16 |
| DMOV16* | Conditional Reg Move/Inport/Outport | 16 |
| TwoMem19 | Two Memory Operations | 19 |
| TwoMov19* | Two Memory/Data Move Operations | 19 |
| DMOV24 | Load/Store Direct/Load Addr/Jump | 24 |
| ThreeMem27 | Three Memory Operations | 27 |
| DL40 | Dual-Load | 40 |

*indicates the field can be nop'ed using a certain bit pattern.

Tables 6-8 provide the various combinations of instruction fragments that may be used within 48, 32 and 16 bit full instructions in accordance with the exemplary embodiment of the invention. While other combinations of instruction fragments are consistent with the use and operation of the invention, certain features of the combination disclosed herein are preferred as discussed in greater detail below. Additionally, where all or part of a full instructions are shown as "reserved," no particular instruction combination is specified or used in the described embodiment, but future use of these full instruction combinations is contemplated.

Table 6 provides the formatting for 16 bit full instructions when performed in accordance with the exemplary embodiment of the invention described herein. The full instruction is comprised of the five (5) bit header followed by eleven (11) instruction bits.

TABLE 6

16-bit full instruction format.

| 11 | | | | | | | | 0 | | |
|---|---|---|---|---|---|---|---|---|---|---|
| Header | | | | | 11 Inst. Bits | | | | | |
| 0 | 0 | 0 | 0 | 0 | MAC8 | | 0 | 0 | 0 | |
| 0 | 0 | 0 | 0 | 0 | ALU8 | | 0 | 0 | 1 | |
| 0 | 0 | 0 | 0 | 0 | Reserved | | 0 | 1 | 0 | |
| 0 | 0 | 0 | 0 | 0 | Reserved | | 0 | 1 | 1 | |
| 0 | 0 | 0 | 0 | 0 | Reserved | | 1 | 0 | 0 | |
| 0 | 0 | 0 | 0 | 0 | Reserved | | 1 | 0 | 1 | |
| 0 | 0 | 0 | 0 | 0 | Reserved | | 1 | 1 | 0 | |
| 0 | 0 | 0 | 0 | 0 | Reserved | | 1 | 1 | 1 | |
| 0 | 0 | 0 | 0 | 1 | OneMem11 | | | | | |

Note:
The 16-bit NOP is obtained using the NOP in MAC8.

The header bits indicate the length of the instruction as well as some information about the type of instruction. For a header of 00000, the least significant three tail bits are used to further specify the operation performed. In particular, tail bits of 000 indicate the remaining eight bits contain a MAC8 instruction fragment. Tail bits of 001 indicate the remaining eight bits contain a ALU8 instruction fragment. For other tail bit combinations, no instructions are specified.

For a header of 00001, the remaining eleven (11) bits contain a OneMem11 insrtuction fragment. By providing a 16 bit full instruction that allows ALU, MAC or memory move operations to be performed, the most common operations can be performed with the shortest full instruction. Since the shortest instruction requires the least amount of memory to store, the use of 16 bit full instruction as described reduces the amount of instruction-memory necessary to perform a particular set of operations. Thus, the overall size of the DSP, and therefore the cost and power consumption, is reduced as well.

The 16 bit instruction is typically used when conditions are such that only one, or a reduce number of, operations can be performed. Typically, the size of the instruction necessary to specify only one operation can be reduced, hence the use of the half-word, or 16 bit instruction performing one operation. Additionally, the 16 bit instruction can be used for a MAC, ALU, memory move or program flow operation which encompasses almost all of the operations one would expect to perform.

Table 7 illustrates the instruction fragment combinations and associated formatting of a 32-bit full instruction when configured in accordance with one embodiment of the invention.

TABLE 7

32-bit full instruction format.

| 27 | | | | | 19 | | 11 | | | 0 |
|---|---|---|---|---|---|---|---|---|---|---|
| Header | | | | | | | 27 Instruction Bits | | | |
| 0 | 0 | 0 | 1 | 0 | ThreeMem27 | | | | | |
| 0 | 0 | 0 | 1 | 1 | ALU8 | | TwoMem19 | | | |
| 0 | 1 | 0 | 0 | 0 | ALU8 | | TwoMov19 | | | |
| 0 | 1 | 0 | 0 | 1 | MAC8 | | TwoMem19 | | | |
| 0 | 1 | 0 | 1 | 0 | MAC8 | | TwoMov19 | | | |
| 0 | 1 | 0 | 1 | 1 | MAC8 | ALU8 | OneMem11 | | | |
| 0 | 1 | 1 | 0 | 0 | MAC16 | | OneMem11 | | | |
| 0 | 1 | 1 | 0 | 1 | ALU16 | | OneMem11 | | | |
| 0 | 1 | 1 | 1 | 0 | DMOV16 | | OneMem11 | | | |
| 0 | 1 | 1 | 1 | 1 | DMOV24 | | | 0 | 0 | 0 |
| 0 | 1 | 1 | 1 | 1 | ALU16 | | MAC8 | 1 | 0 | 0 |
| 0 | 1 | 1 | 1 | 1 | MAC16 | | ALU8 | 0 | 1 | 0 |
| 0 | 1 | 1 | 1 | 1 | Reserved | | | 1 | 1 | 0 |
| 0 | 1 | 1 | 1 | 1 | Reserved | | | | | 1 |

As noted above, the five header bits indicate the length of the full instruction, as well as the particular combination of instruction fragments. For example, a header of 00010 indicates the remaining 27 instruction bits contain a ThreeMem27 instruction fragment, and a header of 00011 indicates the remaining 27 instruction bits contain a ALU8 instruction fragment followed by a TwoMem19 instruction fragment.

For a header of 01111, the least significant tail bits further indicate the combination of instruction fragments. For example, for a least significant tail bit of 0, the next two least significant bits indicate whether the remaining 24 bits contain a DMOV24, a ALU16 followed by a MAC8, or a MAC16 followed by a ALU8 instruction fragments. Other tail bit states, such a least significant tail bit of 1, specify reserved combinations.

The thirty-two bit instruction allows many of the most commonly performed operations to be performed simultaneously, which facilitates pipelining while also reducing the instruction size. For example, it is common to perform two fetch operations and a multiply/accumulate operation for such applications as filtering. The 32-bit instruction allows such sets of operations to be performed in pipelined fashion while not requiring a fill 48 bits of instruction space.

In addition, the 32-bit instruction allows MAC and ALU operations to be performed simultaneously as well as program jump and call operations, also without the use of the largest instruction size.

Table 8 illustrates the instruction fragment combinations and format for 48 bit full instructions when performed in accordance with one embodiment of the invention.

TABLE 8

48-bit full instruction format.

| 43 | | | | 35 | 27 | 19 | 11 | 0 | | | |
|---|---|---|---|---|---|---|---|---|---|---|---|
| Header | | | | | 43 Instruction Bits | | | | | | |
| 0 | 0 | 1 | 0 | 0 | DMOV24 | | MAC8 | OneMem11 | | | |
| 0 | 0 | 1 | 0 | 1 | DMOV24 | | ALU8 | OneMem11 | | | |
| 0 | 0 | 1 | 1 | 0 | DMOV24 | | TwoMem19 | | | | |
| 0 | 0 | 1 | 1 | 1 | DMOV24 | | TwoMov19 | | | | |
| 1 | 0 | 0 | 0 | 0 | MAC16 | | ThreeMem27 | | | | |
| 1 | 0 | 0 | 0 | 1 | MAC8 | ALU8 | ThreeMem27 | | | | |
| 1 | 0 | 0 | 1 | 0 | ALU16 | | ThreeMem27 | | | | |
| 1 | 0 | 0 | 1 | 1 | ALU16 | | MAC8 | TwoMem19 | | | |
| 1 | 0 | 1 | 0 | 0 | ALU16 | | MAC8 | TwoMov19 | | | |
| 1 | 0 | 1 | 0 | 1 | ALU16 | | MAC16 | OneMem11 | | | |
| 1 | 0 | 1 | 1 | 0 | DMOV16 | | MAC16 | OneMem11 | | | |
| 1 | 0 | 1 | 1 | 1 | DMOV16 | | ALU16 | OneMem11 | | | |
| 1 | 1 | 0 | 0 | 0 | DMOV16 | | ThreeMem27 | | | | |
| 1 | 1 | 0 | 0 | 1 | DMOV16 | | MAC8 | TwoMem19 | | | |
| 1 | 1 | 0 | 1 | 0 | DMOV16 | | MAC8 | TwoMov19 | | | |
| 1 | 1 | 0 | 1 | 1 | DMOV16 | | ALU8 | TwoMem19 | | | |
| 1 | 1 | 1 | 0 | 0 | DMOV16 | | ALU8 | TwoMov19 | | | |
| 1 | 1 | 1 | 0 | 1 | MAC16 | | ALU8 | TwoMem19 | | | |
| 1 | 1 | 1 | 1 | 0 | MAC16 | | ALU8 | TwoMov19 | | | |
| 1 | 1 | 1 | 1 | 1 | MAC16 | | DMOV24 | | 0 | 0 | 0 |
| 1 | 1 | 1 | 1 | 1 | MAC8 | ALU8 | DMOV24 | | 0 | 0 | 1 |
| 1 | 1 | 1 | 1 | 1 | ALU16 | | DMOV24 | | 0 | 1 | 0 |
| 1 | 1 | 1 | 1 | 1 | DMOV16 | | DMOV24 | | 0 | 1 | 1 |
| 1 | 1 | 1 | 1 | 1 | DMOV16 | | MAC16 | ALU8 | 1 | 0 | 0 |
| 1 | 1 | 1 | 1 | 1 | DMOV16 | | ALU16 | MAC8 | 1 | 0 | 1 |
| 1 | 1 | 1 | 1 | 1 | DL40 | | | | 1 | 1 | 0 |
| 1 | 1 | 1 | 1 | 1 | Reserved | | | | 1 | 1 | 1 |

The five header bits specify the length of the instruction as well as the particular insrtuction fragment combination. For example, header bits of 00100 indicate the 43 remaining instruction bits are comprised of DMOV24, MAC8 and One-Mem11 instruction fragments. Header bits of 10011 indicate the 43 remaining bits are comprised of ALU16, MAC8 and TwoMem19 instruction fragments.

For header bits of 11111, the three least significant tail bits further indicate the instruction fragments contained in the remaining instruction bits. For example, tail bits of 000 indicate the remaining 40 instruction bits contain MAC16 and DMOV24 instruction fragments. Tail bits of 001 indicate the remaining 40 instruction bits contain MAC8, ALU8 and DMOV24 instruction fragments. Tail bits of 110 indicate the remaining 40 instruction bits contain a DL40 instruction fragment.

The instruction fragment combinations provided in 48 bit full instructions allow many operations to be performed simultaneously and therefore more rapidly than if performed serially. For example, several 48 bit full instructions allow ALU operations, MAC operations and memory operations to all be performed simultaneously. The memory operations include load, store, and data move operations, and often allow multiple memory locations to be accessed at once.

The 48 bit instruction allows multiply operations to be performed in combination with ALU operations and data fetch and program flow operations, all in pipelined fashion. This can be useful for filtering when combined with scaling operations, which are often performed by performing a MAC operation followed by an ALU (such as shifting) operation. Other application which use MAC and ALU operations include combining three or more streams of data. The 48 bit instruction, especially in combination with the use of the three bus architecture, facilities the pipelining of operations in these cases.

This effectively increases the number of operations that can be performed in a single 48 bit full instruction to five (MAC, ALU, FETCH1, FETCH2, and STORE). The ability to simultaneously perform multiple instructions in the DSP, in general, is further enhanced by the use of a DSP with multiple internal buses for coupling the various processing systems within the DSP. Different set of data may be moved and accessed simultaneously using the different busses.

Varying the length of the instruction based on the number of operations that can be performed further increases the efficiency with which instruction memory is used. Any particular task has periods where multiple operations can be performed simultaneously, and other periods where fewer, or only one, operation can be performed. By adjusting the length of the instruction in accordance with the number of operations that can be performed simultaneously, the amount of instruction memory is reduced.

When combined with the use of tight instruction packing, an exemplary method of which is described above, the required instruction memory is further reduced. The use of variable length instructions or tightly packed instructions, or both, facilitate the use of a multiple bus architecture and a multi-access register bank, by making more circuit area available for implementing these features. Thus, the combination of these aspects of the invention combine synergistically to simultaneously provide the benefits of improved performance and improved efficiency.

C. Instruction Fragments

As noted above, full instructions are comprised of a set of one or more instruction fragments grouped together in predefined ways. The set of available instruction fragments in the exemplary embodiment of the invention are shown in Table 5. The instruction fragments and the combinations made available using the full instructions provided in the exemplary embodiment of the invention are designed to allow the set of operations most likely to be performed together to be combined so that the amount of instruction memory necessary to perform a given operation is reduced. A discussion of the operation and format of the various instruction fragments used in the exemplary embodiment of the invention follows.

C.1 Instruction Fragment Nomenclature

Throughout the following discussion of the instruction fragments and subfragments, the following abbreviations are used refer to the registers listed in Tables 9 and 10 below. Additionally, the particular bit codes (mappings) used in the exemplary embodiment of the invention are shown to the left.

TABLE 9

Instruction fragment nomenclature and codes.

|      | Dreg |
|------|------|
| 0000 | R0   |
| 0001 | R1   |
| 0010 | R2   |
| 0011 | R3   |
| 0100 | R4   |
| 0101 | R5   |
| 0110 | R6   |
| 0111 | R7   |
| 1000 | L0h  |
| 1001 | L1h  |
| 1010 | L2h  |
| 1011 | L3h  |
| 1100 | L01  |
| 1101 | L11  |
| 1110 | L21  |
| 1111 | L31  |

|     | R0-R7 | Lh/L1 | A0-A7 | Lreg/Dreg |
|-----|-------|-------|-------|-----------|
| 000 | R0    | L0h   | A0    | L0        |
| 001 | R1    | L1h   | A1    | L1        |
| 010 | R2    | L2h   | A2    | L2        |
| 011 | R3    | L3h   | A3    | L3        |
| 100 | R4    | L01   | A4    | D0        |
| 101 | R5    | L11   | A5    | D1        |
| 110 | R6    | L21   | A6    | D2        |
| 111 | R7    | L31   | A7    | D3        |

|   | AS  | AL  |
|---|-----|-----|
| 0 | AS0 | AL0 |
| 1 | AS1 | AL1 |

|    | R0-R3 | L0-L3 | D0-D3 | C0-C3 | Cmod  |
|----|-------|-------|-------|-------|-------|
| 00 | R0    | L0    | D0    | C0    | ++    |
| 01 | R1    | L1    | D1    | C1    | --    |
| 10 | R2    | L2    | D2    | C2    | ++CM0 |
| 11 | R3    | L3    | D3    | C3    | ++CM1 |

|       | cond   |       |       |       |       |       |       |       |       |
|-------|--------|-------|-------|-------|-------|-------|-------|-------|-------|
| 00000 | LT     | 01000 | L0LT  | 10000 | L1LT  | 11000 | L2LT  |
| 00001 | LE     | 01001 | L0LE  | 10001 | L1LE  | 11001 | L2LE  |
| 00010 | EQ     | 01010 | L0EQ  | 10010 | L1EQ  | 11010 | L2EQ  |
| 00011 | NE     | 01011 | L0NE  | 10011 | L1NE  | 11011 | L2NE  |
| 00100 | GE     | 01100 | L0GE  | 10100 | L1GE  | 11100 | L2GE  |
| 00101 | GT     | 01101 | L0GT  | 10101 | L1GT  | 11101 | L2GT  |
| 00110 | OV     | 01110 | L0OV  | 10110 | L1OV  | 11110 | L2OV  |
| 00111 | Uncond | 01111 | Rsvd  | 10111 | Rsvd  | 11111 | Rsvd  |

Notes:
L3 does not have conditionals.

TABLE 10

Instruction fragment nomenclature and codes.

|       | RegA | regB |
|-------|------|------|
| 00000 | R0   | R0   |
| 00001 | R1   | R1   |
| 00010 | R2   | R2   |
| 00011 | R3   | R3   |
| 00100 | R4   | R4   |
| 00101 | R5   | R5   |
| 00110 | R6   | R6   |
| 00111 | R7   | R7   |
| 01000 | L0h  | L0h  |
| 01001 | L1h  | L1h  |
| 01010 | L2h  | L2h  |
| 01011 | L3h  | L3h  |
| 01100 | L01  | L01  |
| 01101 | L11  | L11  |
| 01110 | L21  | L21  |
| 01111 | L31  | L31  |
| 10000 | A0   | B0   |
| 10001 | A1   | B1   |
| 10010 | A2   | B2   |
| 10011 | A3   | B3   |
| 10100 | A4   | B4   |
| 10101 | A5   | B5   |
| 10110 | A6   | B6   |
| 10111 | A7   | B7   |
| 11000 | AS0  | BS0  |
| 11001 | AS1  | BS1  |
| 11010 | AL0  | BL0  |
| 11011 | AL1  | BL1  |
| 11100 | AM0  | BM0  |
| 11101 | AM1  | BM1  |
| 11110 | Reserved | Reserved |
| 11111 | Reserved | Reserved |

|      | regC     |
|------|----------|
| 0000 | L0       |
| 0001 | L1       |
| 0010 | L2       |
| 0011 | L3       |
| 0100 | D0       |
| 0101 | D1       |
| 0110 | D2       |
| 0111 | D3       |
| 1000 | C0       |
| 1001 | C1       |
| 1010 | C2       |
| 1011 | C3       |
| 1100 | CM0      |
| 1101 | CM1      |
| 1110 | Reserved |
| 1111 | Reserved | regA consists of all the registers that can be loaded from/stored to A memory.
regB consists of all the registers that can be loaded from/stored to B memory.
regC consists of all the registers that can be loaded from/stored to C memory.

C.2 Instruction Fragment Description

The set of instruction fragments includes two types of MAC instructions fragments: MAC8 and MAC16. MAC8 instruction fragments support signed-unsigned and signed-signed multiply types, with the results being stored in accumulators L0 or L1. The MAC8 instruction fragment saves instruction RAM by allowing a MAC operation using a 16 bit full instruction, and for many parallel instruction combinations requiring MAC operations to be encoded into 32-bit instruction instead of 48-bit instructions. In general, the processing performed by a MAC8 instruction conforms to the following equation:

$$\begin{Bmatrix} L0 \\ L1 \end{Bmatrix} = \begin{bmatrix} L0 \pm \\ L1 \pm \end{bmatrix} \begin{Bmatrix} R0 \\ R2 \\ R4 \\ R6 \end{Bmatrix} * \begin{Bmatrix} R0 \\ R1 \\ R3 \\ R5 \end{Bmatrix} \begin{bmatrix} (SU) \\ (SS) \end{bmatrix}. \quad (2)$$

As shown in equation (2), the MAC8 instruction fragment allows the contents of registers L0 or L1 to be summed with the product of registers R0, R2. R4 and R6 and R0, R1, R3, and R5, or set directly to the product of registers. Additionally, signed or unsigned multiplies may be specified. By limiting the number of registers for which the MAC operations may be performed using a MAC8 instruction, the length of the instruction can be kept to 8 bits, allowing the MAC operations to be performed using a shorter, 8 bit, instruction fragment.

The particular operation performed by the MAC8 instruction is specified by the values of the eight bits that make up the instruction as set forth in Table 11.

TABLE 11

MAC8 instruction fragment format.

| 7 | 6 | 5 | 4 | 3 | 2 | 1 | 0 |
|---|---|---|---|---|---|---|---|
| MAC Operation | | | mac8Op1 | | mac8Op2 | | SU/SS |

SU/SS specifies signed or unsigned multiply. The codes for specifying various operations within the MAC8 instruction fragment are listed in Table 12.

TABLE 12

MAC8 instruction fragment codes

| MAC Operation | | mac8Op1 | | mac8Op2 | |
|---|---|---|---|---|---|
| 000 | L0 = | 00 | R0 | 00 | R0 |
| 001 | L1 = | 01 | R2 | 01 | R1 |
| 010 | L0 = L1+ | 10 | R4 | 10 | R3 |
| 011 | L1 = L1+ | 11 | R6 | 11 | R5 |
| 100 | L0 = L0− | | | | |
| 101 | L1 = L1− | SU/SS | | | |
| 110 | L0 = L1+ | 0 | SU | | |
| 111 | L0 = L1− | 1 | SS | | |

Thus, a MAC8 instruction of 0×99 places the sum the contents of register L0 with the unsigned product of registers R0 and R3 into register L0.

The MAC16 instruction fragment provides additional flexibility by allowing additional registers to be used in the multiply-accumulate operation. Equation (3) sets forth the operations that can be performed using the MAC16 instruction fragment.

$$\begin{Bmatrix} L0 \\ L1 \\ L2 \\ L3 \end{Bmatrix} = \begin{bmatrix} L0 \ [>> 16] \pm \\ L1 \ [>> 16] \pm \\ L2 \ [>> 16] \pm \\ L3 \ [>> 16] \pm \end{bmatrix} \quad (3)$$

*macOp1* ∗ *macOp2* [(*mtype*)] [<< *mshift*] [:*CPS*];

For example, every accumulator (L0-L3) can be used as a destination, although not all combinations off accumulators are allowed in multiply-accumulate instructions. The CPS field signals that a coprocessor should perform a particular operation in parallel. The particular operation performed by the MAC16 instruction is specified by the values of the sixteen bits that make up the instruction are set forth in Table 13.

TABLE 13

MAC16 instruction fragment format.

| 15 14 13 12 | 11 10 9 8 | 7 6 5 4 | 3 2 | 1 | 0 |
|---|---|---|---|---|---|
| MAC Operation | macOp1 | macOp2 | mtype | mshift | CPS |

The codes for specifying various operations within the MAC16 instruction fragment are listed in Table 14.

TABLE 14

MAC16 instruction fragment codes.

| | MAC Operation | macOp2 |
|---|---|---|
| 0000 | L0= | R0 |
| 0001 | L1= | R1 |
| 0010 | L0 = L0 [>>16]+ | R2 |
| 0011 | L1 = L1 [>>16]+ | R3 |
| 0100 | L0 = L0 [>>16]− | R4 |
| 0101 | L1 = L1 [>>16]− | R5 |
| 0110 | L0 = L1 [>>16]+ | R6 |
| 0111 | L0 = L1 [>>16]− | R7 |
| 1000 | L2= | L0h |
| 1001 | L3= | L1h |
| 1010 | L2 = L2 [>>16]+ | L2h |
| 1011 | L3 = L3 [>>16]+ | L3h |
| 1100 | L2 = L2 [>>16]− | L0l |
| 1101 | L3 = L3 [>>16]− | L1l |
| 1110 | L2 = L3 [>>16]+ | L2l |
| 1111 | L2 = L3 [>>16]− | L3l |

| macOp1 | |
|---|---|
| 000 | R0 |
| 001 | R2 |
| 010 | R4 |
| 011 | R6 |
| 100 | L0h |
| 101 | L1h |
| 110 | L2h |
| 110 | L3h |

| mtype | |
|---|---|
| 00 | (SU) |
| 01 | (UU) |
| 10 | (SS) |
| 11 | See note |

| mshift | |
|---|---|
| 00 | <<0 |
| 01 | <<1 |
| 10 | <<2 |
| 11 | <<3 |

| CPS | |
|---|---|
| 0 | OFF |
| 1 | ON |

Notes:
The instruction L0 = R0*R0(SU)<<0 is decoded as a NOP.
mtype 11 is used as RND for straight multiplies and shift accumulator right by 16 for signed-signed multiply/accumulate instructions.
MAC instructions with mtype SU and macOp1 = macOp2 are illegal.

The MAC16 instruction fragment allows left shifts of up to 3, and can perform round operations during straight multiplies (no accumulate), with the round occurring after the shift. When an accumulation is performed, the accumulator to be added can be shifted down by 16 in parallel with a signed-signed multiply. The CPS bit is the coprocessor strobe bit for indicating that data used in the MAC operation should be sent to a coprocessor.

It should be noted that the MAC8 instruction fragment performs a subset of the operations that can be performed by the MAC16. The particular set of instructions selected for the MAC8 instruction fragment are the most commonly performed out of the set of operations that can be performed using the MAC16 instruction fragment. This saves program memory by allowing the majority of MAC operations to be performed using the MAC8 instruction fragment.

The 8 bit ALU8 instruction fragment comprises the ALU operations that are most commonly paralleled with MAC operations (MAC8 and MAC16) and which do no contain immediate data. All ALU8 shift operations are arithmetic shifts that use an internal shift register (SR) register to save instruction encoding bits. The operations performed using the ALU8 instruction fragment are shown in Table 15.

TABLE 15

ALU8 instruction fragment operations.

| | |
|---|---|
| NOP; | NOP (needed for parallel combinations). |
| LD = DETNORM(LS); | Determine block normalization factor. |
| LD = SET(LS); | Copy accumulator (no saturation). |
| LD = LS << SR; | Shift accumulator. |

TABLE 15-continued

ALU8 instruction fragment operations.

| | |
|---|---|
| LD = RND(LS << SR); | Shift and round accumulator. |
| LD = LD ± (LS << SR); | Accumulate shifted accumulator. |
| LD = LS ± LT; | Add or subtract accumulators. |
| LS ± LT; | Add/subtract accs result free (set flags). |

LS is load source (L0-L3) and LD is load destination (L0-L3).

The particular operations performed by the ALU8 instruction fragment are specified by the values of the eight bits that make up the instruction fragment as set forth in Table 16.

TABLE 16

ALU8 instruction fragment format.

| 7 | 6 | 5 | 4 | 3 | 2 | 1 | 0 |
|---|---|---|---|---|---|---|---|
| 0 | ALUOp | | | LS | | LD | |
| 0 | 1 | 1 | Sign | LS | | LT | |
| 1 | LD | | Sign | LS | | LT | |

The particular codes used to specify the operations performed using the ALU8 instruction fragment are set forth in Table 17.

TABLE 17

ALU8 instruction fragment codes.

| ALUOp | |
|---|---|
| 0 0 0 | LD = DETNORM(LS) |
| 0 0 1 | LD = SET(LS) |
| 0 1 0 | LD = LS << SR |
| 0 1 1 | LD = RND(LS << SR) |
| 1 0 0 | LD = LD + (LS << SR) |
| 1 0 1 | LD = LD - (LS << SR) |
| 1 1 0 | LS + LT |
| 1 1 1 | LS - LT |

| LD / LS / LT | |
|---|---|
| 0 0 | L0 |
| 0 1 | L1 |
| 1 0 | L2 |
| 1 1 | L3 |

| Sign | |
|---|---|
| 0 | [LD =] LS + LT |
| 1 | [LD =] LS - LT |

Note:
The all-zeros instruction L0 = DETNORM(L0) is decoded as a NOP.
Instructions where LD = DETNORM(LD) are illegal.
The ALU8 clear accumulator instruction is LD = LD - LD.

The ALU16 instruction fragment allows both arithmetic and logical shifts. The particular operations performed by the ALU16 instruction fragment are set forth in Table 18.

The notation << signifies an arithmetic shift, while <<< signifies a logical shift.

TABLE 18

ALU16 instruction fragment operations.

| | | |
|---|---|---|
| (a) | IF cond NOP; | Conditional NOP (for parallel combinations). |
| (b) | IF cond LD = SET(LS); | Conditionally copy accumulator. |
| (c) | IF cond LD = LS ± LT; | Conditionally add/subtract accs. |
| (d) | LD = NORM(LS,SR); | Normalize accumulator. |
| (e) | LD = ABS(LS); | Absolute value of accumulator. |
| (f) | LD = -LS; | Negate accumulator. |
| (g) | LD = ~LS; | Invert accumulator (1's complement). |
| (h) | LD = BIT(immediate5); | Create bit mask (LD = 0×1<<imm5). |
| (i) | LD = ~BIT(immediate5); | Create inverted bit mask (LD = ~(0×1<<imm5)). |
| (j) | $LD = LS \begin{Bmatrix} \& \\ | \\ \wedge \end{Bmatrix} \begin{Bmatrix} LT \\ BIT(immediate5) \\ \sim BIT(immediate5) \end{Bmatrix};$ | Bitwise AND, OR, XOR. |
| (k) | $LD = [RND]\left(LS \begin{Bmatrix} << \\ <<< \end{Bmatrix} \begin{Bmatrix} R0 - R3 \\ immediate6 \end{Bmatrix}\right);$ | Shift [& round] acc. |
| (l) | $LD = LS + \left(LT \begin{Bmatrix} << \\ <<< \end{Bmatrix} immediate6\right);$ | Shift and add accs. |
| (m) | $\begin{Bmatrix} L0h - L3h \\ R0 - R3 \end{Bmatrix} = \begin{Bmatrix} L0h - L3h \\ R0 - R3 \end{Bmatrix} \pm \{R0 - R7\};$ | Add regs. |
| (n) | $\begin{Bmatrix} L0h - L3h \\ R0 - R3 \end{Bmatrix} = \begin{Bmatrix} L0h - L3h \\ R0 - R3 \end{Bmatrix} + immediate6$ | Add immediate. |
| (o) | $\begin{Bmatrix} L0h - L3h \\ R0 - R3 \end{Bmatrix} = SET(immediate6);$ | Load immediate. |
| (p) | $\begin{Bmatrix} L0h - L3h \\ R0 - R3 \end{Bmatrix} = \begin{Bmatrix} L0h - L3h \\ R0 - R3 \end{Bmatrix} \begin{Bmatrix} \& \\ | \\ \wedge \end{Bmatrix} \{R0 - R7\}$ | 16-bit Logical. |
| (q) | {R0 - R3} = SR ± {R0 - R7}; | Add register to SR. |
| (r) | {R0 - R3} = SR + immediate6; | Add immediate to SR. |
| (s) | SR = {R0 - R3} + immediate6; | Load SR with immediate sum. |
| (t) | SR = SET(immediate6); | Load SR immediate. |

The instruction L0=SET(L0) is decoded as a NOP.

The format of the ALU16 instruction fragment are set forth in Table 19.

TABLE 19

16-bit ALU instruction fragment format and codes.

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| (l) | 0 | 0 | +/- | AL | LT | | LS | | LD | | immediate6 | | | | | |
| (c) | 0 | 1 | 0 | 0 | LT | | LS | | LD | | Cop1 | | cond | | | |
| (k) | 0 | 1 | 0 | 1 | Sop2 | AL | LS | | LD | | immediate6 | | | | | |
| (j) | 0 | 1 | 1 | BitOp | | Inv | LS | | LD | | immediate6 | | | | | |
| (p) | 0 | 1 | 1 | 1 | 1 | BitOp | | dregh(dst) | | | dregh(src) | | R0-R7(src) | | | |
| (o) | 0 | 1 | 1 | 1 | 1 | 1 | 1 | dregh(dst) | | | immediate6 | | | | | |
| (n) | 1 | 0 | 0 | 0 | dregh(src) | | | dregh(dst) | | | immediate6 | | | | | |
| (m) | 1 | 0 | 0 | 1 | 0 | 0 | +/- | dregh(dst) | | | dregh(src) | | R0-R7 (src) | | | |
| | 1 | 0 | 0 | 1 | 0 | 1 | Reserved (all zeros) | | | | | | | | | |
| | 1 | 0 | 0 | 1 | 1 | | Reserved (all zeros) | | | | | | | | | |
| | 1 | 0 | 1 | | | | Reserved (all zeros) | | | | | | | | | |
| (b) | 1 | 1 | 0 | 0 | 0 | 0 | LS | | LD | | Cop2 | | cond | | | |
| (h-i) | 1 | 1 | 0 | 0 | 0 | 1 | 0 | Inv | LD | | immediate6 | | | | | |
| (r) | 1 | 1 | 0 | 0 | 0 | 1 | 1 | 0 | R0-R3 (d) | | immediate6 | | | | | |
| (s) | 1 | 1 | 0 | 0 | 0 | 1 | 1 | 1 | R0-R3 (s) | | immediate6 | | | | | |
| (k) | 1 | 1 | 0 | 0 | 1 | 0 | 0 | 0 | R0-R3 (s) | | Sop1 | AL | LS | | LD | |
| (j) | 1 | 1 | 0 | 0 | 1 | 0 | 0 | 1 | BitOp | | LT | | LS | | LD | |
| (d-g) | 1 | 1 | 0 | 0 | 1 | 0 | 0 | 1 | 1 | 1 | AccOp | | LS | | LD | |
| (t) | 1 | 1 | 0 | 0 | 1 | 0 | 1 | 0 | 0 | 0 | immediate6 | | | | | |
| (q) | 1 | 1 | 0 | 0 | 1 | 0 | 1 | 0 | 0 | 1 | R0-R3 (d) | | R0-R7 (src) | | | |
| | 1 | 1 | 0 | 0 | 1 | 0 | 1 | 0 | 1 | | Reserved (all zeros) | | | | | |
| | 1 | 1 | 0 | 0 | 1 | 0 | 1 | 1 | | | Reserved (all zeros) | | | | | |
| | 1 | 1 | 0 | 0 | 1 | 1 | | | | | Reserved (all zeros) | | | | | |
| | 1 | 1 | 0 | 1 | | | | | | | Reserved (all zeros) | | | | | |
| | 1 | 1 | 1 | | | | | | | | Reserved (all zeros) | | | | | |

The particular operations performed by the ALU16 instruction fragment are specified by the values of the bits that make up the instruction fragment as set forth in Table 20.

TABLE 20

ALU16 instruction fragment codes.

| Dregh | |
|---|---|
| 000 | R0 |
| 001 | R1 |
| 010 | R2 |
| 011 | R3 |
| 100 | L0h |
| 101 | L1h |
| 110 | L2h |
| 111 | L3h |

| BitOp | |
|---|---|
| 00 | AND |
| 01 | OR |
| 10 | XOR |

| Sop1 | |
|---|---|
| 0 | LD = LS << R0-R3 |
| 1 | LD = RND(LS << R0-R3) |

| Sop2 | |
|---|---|
| 0 | LD = LS << imm6 |
| 1 | LD = RND(LS << imm6) |

| AL | |
|---|---|
| 0 | Arithmetic Shift |
| 1 | Logical Shift |

| AccOp | |
|---|---|
| 00 | LD = NORM(LS,SR) |
| 01 | LD = ABS(LS) |
| 10 | LD = -LS |
| 11 | LD = ~LS |

| Cop1 | |
|---|---|
| 0 | LD = LS + LT |
| 1 | LD = LS - LT |

| Cop2 | |
|---|---|
| 0 | LD = SET(LS) |
| 1 | Reserved |

| +/- | |
|---|---|
| 0 | + |
| 1 | - |

| Inv | |
|---|---|
| 0 | Normal bitmask |
| 1 | Inverse bitmask |

Notes:
The all zeros instruction L0 = SET(L0); is decoded as a NOP.
For BIT instructions (h, i, j), the assembler encodes immediate6 by appending a zero sign bit with immediate5 (this simplifies decoding).

The DMOV16 instruction fragment is a 16 bit instruction fragment for performing different data move, data inport and data outport operations as set forth in Table 21.

TABLE 21

DMOV16 instruction fragment operations.

(a) NOP;  NOP for Parallel Instructions.

(b) LC = immediate9;  Load Loop Counter Immediate (push).

(c) $\begin{Bmatrix} AM0 - AM1 \\ BM0 - BM1 \\ CM0 - CM1 \end{Bmatrix} = \text{immediate10};$  Load Modify Register Immediate.

(d) $\begin{Bmatrix} AL0 - AL1 \\ BL0 - BL1 \end{Bmatrix} = \text{immediate11};$  Load Circular Length Register Immediate.

(e) $\begin{Bmatrix} L0 - L3 \\ D0 - D3 \\ L0h - L3h \end{Bmatrix} = \text{INPORT(port\_addr)};$  Inport Operation (f) $\text{OUTPORT(port\_addr)} = \begin{Bmatrix} R0 - R7 \\ L0h - L3h \\ L0l - L3l \end{Bmatrix}$  Outport Operation.

(g) OUTPORTA(port_addr);  Outport Value on Bus A.

(h) OUTPORTB(port_addr);  Outport Value on Bus B.

The format and codes used to perform the operations available using the DMOV16 instruction fragment are set forth in Table 22.

TABLE 22

DMOV16 instruction fragment format.

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | 0 | 0 | 0 | \multicolumn{13}{c}{Reserved (all zeros)} | | | | | | | | | | |
| (d) | 0 | 0 | 1 | 0 | AL | | | | immediate11 (im1) | | | | | | | |
| (d) | 0 | 0 | 1 | 1 | BL | | | | immediate11 (im2) | | | | | | | |
| (c) | 0 | 1 | 0 | 0 | 0 | AM | | | immediate10 (im1) | | | | | | | |
| (c) | 0 | 1 | 0 | 0 | 1 | BM | | | immediate10 (im2) | | | | | | | |
| (c) | 0 | 1 | 0 | 1 | 0 | CM | | | immediate10 (im3) | | | | | | | |
| | 0 | 1 | 0 | 1 | 1 | | | | Reserved (all zeros) | | | | | | | |
| (b) | 0 | 1 | 1 | 0 | 0 | 0 | 0 | | immediate9 (im1) | | | | | | | |
| | 0 | 1 | 1 | 0 | 0 | 0 | 1 | | Reserved (all zeros) | | | | | | | |
| | 0 | 1 | | 1001-1111 | | | | | Reserved (all zeros) | | | | | | | |
| (e) | 1 | 0 | 0 | 0 | 0 | 0 | L0-L3 | | | Inport address (PI3) | | | | | | |
| (e) | 1 | 0 | 0 | 0 | 0 | 1 | D0-D3 | | | Inport address (PI3) | | | | | | |
| (e) | 1 | 0 | 0 | 0 | 1 | 0 | L0h-L3h | | | Inport address (PI3) | | | | | | |
| | 1 | 0 | | 0011-1111 | | | | | Reserved (all zeros) | | | | | | | |
| (f) | 1 | 1 | 0 | 0 | | dreg | | | Outport address (Abus, PO1) | | | | | | | |
| (f) | 1 | 1 | 0 | 1 | | dreg | | | Outport address (Bbus, PO2) | | | | | | | |
| (g) | 1 | 1 | 1 | 0 | 0 | 0 | 0 | 0 | Outport address (Reads A bus) | | | | | | | |
| (h) | 1 | 1 | 1 | 0 | 0 | 0 | 0 | 1 | Outport address (Reads B bus) | | | | | | | |
| | 1 | 1 | | 10001-11111 | | | | | Reserved (all zeros) | | | | | | | |

Notes:
The instruction LC = 0 is decoded as a NOP.
mmediate10 is signed, immediate9 and immediate11 are unsigned.

The instruction OUTPORTA(port_addr) reads the value on Abus and outputs it to the designated port. By reading a value from memory A simultaneously, this instruction can be used to send a value directly from memory A to the port. OUTPORTB(port_addr) operates similarly.

The DMOV24 instruction fragment is a 24 bit instruction fragment for performing different load/store register direct or load register immediate operations as set forth in Table 23.

TABLE 23

DMOV24 instruction fragment operations.

(a) {regA} = memA(address14);

(b) memA(address14) = {regA};  L/S direct memory A (c) {regB} = memB(address14);

(d) memB(address14) = {regB};  L/S direct memory B (e) {regC} = memC(address14);

(f) memC(address14) = {regC};  L/S direct memory C (g) $\begin{Bmatrix} A0-A7 \\ B0-B7 \\ C0-C3 \end{Bmatrix}$ = address14;   Load Address Register Immediate.

TABLE 23-continued

DMOV24 instruction fragment operations.

(h) $\begin{Bmatrix} AS0-AS1 \\ BS0-BS1 \end{Bmatrix}$ = address14;   Load Circular Start Register Immediate.

(i) $\begin{Bmatrix} R0-R7 \\ L0h-L3h \\ L0l-L3l \end{Bmatrix}$ = immediate6;   Load Data Register Immediate.

(j) LOOP UNTIL address17;   Loop until end address.

(k) CALL address17;   Function Call.

(l) [IF cond]$\begin{Bmatrix} JUMP \\ JUMPD \end{Bmatrix}$address17;   [Conditional] [Delayed] Jump.

Start Registers are located in the AGU units.

Table 24. provides the format and some codes used to perform the various operation available using the DMOV24 instruction fragment in accordance with the exemplary embodiment of the invention.

TABLE 24

DMOV24 instruction fragment format and codes.

| | 23 | 22 | 21 | 20 | 19 | 18 | 17 | 16 | 15 | 14 | 13-0 |
|---|---|---|---|---|---|---|---|---|---|---|---|
| (l) | 0 | 0 | | | cond | | | | | | address 17 (JUMP) |
| (l) | 0 | 1 | | | cond | | | | | | address 17 (JUMPD) |
| (j) | 1 | 0 | 0 | 0 | 0 | 0 | 0 | | | | address 17 (LOOP) |
| (k) | 1 | 0 | 0 | 0 | 0 | 0 | 1 | | | | address 17 (CALL) |
| (g) | 1 | 0 | 0 | 0 | 0 | 1 | 0 | A0-A7 | | | address 14 (im1) |
| (g) | 1 | 0 | 0 | 0 | 0 | 1 | 1 | B0-B7 | | | address 14 (im2) |
| (e) | 1 | 0 | 0 | 0 | 1 | 0 | | regC (dst) | | | address 14 (im3, Cbus + PI3) |
| (f) | 1 | 0 | 0 | 0 | 1 | 1 | | regC (src) | | | address 14 (im3, Cbus + PO3) |
| (a) | 1 | 0 | 0 | 1 | 0 | | | regA (dst) | | | address 14 (im1, Abus + PI1) |
| (b) | 1 | 0 | 0 | 1 | 1 | | | regA (src) | | | address 14 (im1, Abus + PO1) |
| (c) | 1 | 0 | 1 | 0 | 0 | | | regB (dst) | | | address 14 (im2, Bbus + PI2) |
| (d) | 1 | 0 | 1 | 0 | 1 | | | regB (sre) | | | address 14 (im2, Bbus + PO2) |
| (i) | 1 | 0 | 1 | 1 | | dreg | | | | | immediate 16 (im1 + PI1) |
| (i) | 1 | 1 | 0 | 0 | | dreg | | | | | immediate 16 (im2 + PI2) |
| (g) | 1 | 1 | 0 | 1 | 0 | 0 | 0 | 0 | C0-C3 | | address 14 (im3) |
| (h) | 1 | 1 | 0 | 1 | 0 | 0 | 0 | 1 | 0 | AS | address 14 (im1) |
| (h) | 1 | 1 | 0 | 1 | 0 | 0 | 0 | 1 | 1 | BS | address 14 (im2) |
| | 1 | 1 | 0 | 1001-1111 | | | | | | | Reserved (all zeros) |
| | 1 | 1 | 1 | | | | | | | | Reserved (all zeros) |

Notes:

Address14 and address17 are unsigned, immediate16 is signed.

It should be noted that, for DMOV24 as well as other instruction fragments, some operations are encoded twice. For example, the formats specified in rows (i) and () encode the same operation, with one specifying the use of immediate bus Im1 and the other specifying the use of Immediate bus Im2. Encoding twice allows the instruction fragment to be combined with a greater variety of other instruction fragments, which may require the use of Immediate bus 1 or Immediate bus 2 as well.

The 40-bit dual load instruction fragment (DL40) is a 40 bit instruction fragment for performing immediate load or address load operations. The particular operations performed in the exemplary embodiment of the invention are as shown in Table 25.

TABLE 25

DL40 instruction fragment format.

(a) $\{A0 - A3\}$ = address14, $\{B0 - B3\}$ = address14;

(b) $\{A0 - A3\}$ = address14, $\{C0 - C3\}$ = address14;

(c) $\{B0 - B3\}$ = address14, $\{C0 - C3\}$ = address14;

(d) $\begin{Bmatrix} A0 - A3 \\ B0 - B3 \\ C0 - C3 \end{Bmatrix}$ = address14, $\begin{Bmatrix} R0 - R7 \\ L0h - L3h \\ L0l - L3l \end{Bmatrix}$ = immediate16;

TABLE 25-continued

DL40 instruction fragment format.

(e) $\begin{Bmatrix} L0 - L3 \\ D0 - D3 \end{Bmatrix}$ = immediate32;

(f) $\{A0 - A3\}$ = address14, regB = memB(address14);

(g) $\{B0 - B3\}$ = address14, regA = memA(address14);

(h) $\{A0 - A3\}$ = address14, regC = memC(address14);

(i) $\{C0 - C3\}$ = address14, regA = memA(address14);

(j) $\{B0 - B3\}$ = address14, regC = memC(address14);

(k) $\{C0 - C3\}$ = address14, regB = memB(address14);

(l) regA = memA(address14), regB = memB(address14);

(m) regA = memA(address14), regC = memC(address14);

(n) regB = memB(address14), regC = memC(address14);

The format of the DL40 instruction fragment for each operation is provided in Table 26.

TABLE 26

DL40 instruction fragment format and codes.

|     | 39 | 38 | 37 | 36 | 35 | 34 | 33 | 32 | 31 | 30 | 29-16 | 15-14 | 13-0 |
|-----|----|----|----|----|----|----|----|----|----|----|-------|-------|------|
|     | 0  | 0  | 0  | 0  | 0  |    |    |    |    |    | Reserved | | |
| (e) | 0  | 0  | 0  | 0  | 1  | Lreg/Dreg | | | | | immediate32 | | |
| (d) | 0  | 0  | 0  | 1  | A0-A3 | | | dreg | | | address14 | | immediate16 |
| (d) | 0  | 0  | 1  | 0  | B0-B3 | | | dreg | | | address14 | | immediate16 |
| (d) | 0  | 0  | 1  | 1  | B0-B3 | | | dreg | | | address14 | | immediate16 |
| (b) | 0  | 1  | 0  | 0  | 0  | 0  | 0  | 0  | C0-C3 | | Caddress14 | A0-A3 | Aaddress14 |
| (c) | 0  | 1  | 0  | 0  | 0  | 0  | 0  | 1  | C0-C3 | | Caddress14 | B0-B3 | Baddress14 |
| (a) | 0  | 1  | 0  | 0  | 0  | 0  | 1  | 0  | A0-A3 | | Aaddress14 | B0-B3 | Baddress14 |
|     | 0  | 1  | 0  | 0  | 0  | 0  | 1  | 1  | Reserved (all zeros) | | | | |
|     | 0  | 1  | 0  | 0  | 0  | 1  |    |    | Reserved (all zeros) | | | | |
| (h) | 0  | 1  | 0  | 0  | 1  | 0  | regC | | | | Caddress14 | A0-A3 | Aaddress14 |
| (j) | 0  | 1  | 0  | 0  | 1  | 1  | regC | | | | Caddress14 | B0-B3 | Baddress14 |
| (g) | 0  | 1  | 0  | 1  | 0  | regA | | | | | Aaddress14 | B0-B3 | Baddress14 |
| (i) | 0  | 1  | 0  | 1  | 1  | regA | | | | | Aaddress14 | C0-C3 | Caddress14 |
| (f) | 0  | 1  | 1  | 0  | 0  | regB | | | | | Baddress14 | A0-A3 | Aaddress14 |
| (k) | 0  | 1  | 1  | 0  | 1  | regB | | | | | Baddress14 | C0-C3 | Caddress14 |
|     | 0  | 1  | 1  | 1  | Reserved | | | | | | | | |
| (m) | 1  | 0  | 0  | regC | | | re… | | | | Caddress14 | …gA | Aaddress14 |
| (n) | 1  | 0  | 1  | regC | | | re… | | | | Caddress14 | …gB | Baddress14 |
| (l) | 1  | 1  | regA | | | | re… | | | | Aaddress14 | …gB | Baddress14 |

Notes:
Address14 is unsigned, immediate16 and immediate32 are signed.

As also shown in Table 5, four types of memory move and program flow instruction fragments are provided in the exemplary embodiment of the invention, a list of which is provided in Table 27.

TABLE 27

Memory move and program flow instruction fragments.

OneMem11
TwoMem19
TwoMov19
ThreeMem27

Each memory move and program flow instruction (MMPF) fragment is comprised of a set of MMPF subfragments listed in Table 28.

TABLE 28

Combination data move and program flow instruction subfragments.
Instruction Subfragments

| LD(A)   | Load Memory A Indirect        | 8 |
| ST(A)   | Store Memory A Indirect       | 8 |
| LD(B)   | Load Memory B Indirect        | 8 |
| ST(B)   | Store Memory B Indirect       | 8 |
| LS(C)*  | Load/Store Memory C Indirect  | 8 |
| DMOVA*  | Bus A Register Move           | 8 |
| DMOVB*  | Bus B Register Move           | 8 |
| PF8     | 8-bit Program Flow            | 8 |

The format and operation of the MMPF instruction fragments are discussed first, followed by a more detailed discussion of the format and operation of the MMPF subfragments.

The OneMem11 MMPF instruction fragment is used to perform single memory load and store operations, data move operations, and program flow operations. In the exemplary embodiment provided herein eight different operations are performed using the OneMem11 MMPF instruction fragment, with the particular operation indicated by the first three bits of eleven bit fragment as shown in Table 29, which lists the operations that can be performed using a OneMem11 data move instruction fragment.

TABLE 29

OneMem11 instruction fragment format.

| 10 | 9 | 8 | 7 | 6 | 5 | 4 | 3 | 2 | 1 | 0 |
|----|---|---|---|---|---|---|---|---|---|---|
| 0  | 0 | 0 | LD(A) | | | | | | | |
| 0  | 0 | 1 | ST(A) | | | | | | | |
| 0  | 1 | 0 | LD(B) | | | | | | | |
| 0  | 1 | 1 | ST(B) | | | | | | | |
| 1  | 0 | 0 | LS(C) | | | | | | | |
| 1  | 0 | 1 | DMOVA | | | | | | | |
| 1  | 1 | 0 | DMOVB | | | | | | | |
| 1  | 1 | 1 | PP8 | | | | | | | |

TwoMem19 MMPF instruction fragment is a 19 bit instruction fragment that allows eight different combinations of memory load and store operations to be performed as set forth in Table 30.

TABLE 30

TwoMem19 instruction fragment format.

| 18 | 17 | 16 | 15-8 | 7-0 |
|---|---|---|---|---|
| 0 | 0 | 0 | LD(A) | LD(B) |
| 0 | 0 | 1 | LD(A) | ST(B) |
| 0 | 1 | 0 | LD(A) | LS(C) |
| 0 | 1 | 1 | ST(A) | LD(B) |
| 1 | 0 | 0 | ST(A) | ST(B) |
| 1 | 0 | 1 | ST(A) | LS(C) |
| 1 | 1 | 0 | LS(C) | LD(B) |
| 1 | 1 | 1 | LS(C) | ST(B) |

The TwoMov19 MMPF instruction fragment is a 19 bit instruction fragment that allows eight different combinations of memory load and store operations along with data move operations as shown in Table 31.

TABLE 31

TwoMov19 instruction fragment format.

| 18 | 17 | 16 | 15-8 | 7-0 |
|---|---|---|---|---|
| 0 | 0 | 0 | LD(A) | DMOVB |
| 0 | 0 | 1 | ST(A) | DMOVB |
| 0 | 1 | 0 | DMOVA | LD(B) |
| 0 | 1 | 1 | DMOVA | ST(B) |
| 1 | 0 | 0 | DMOVA | LS(C) |
| 1 | 0 | 1 | LS(C) | DMOVB |
| 1 | 1 | 0 | DMOVA | DMOVB |
| 1 | 1 | 1 | Reserved | |

The ThreeMem27 MMPF instruction fragment is a 27 bit instruction fragment that allows eight different combinations of memory load, memory store, and data operations to be performed as shown in Table 32.

TABLE 32

ThreeMem27 instruction fragment format.

| 26 | 25 | 24 | 23-16 | 15-8 | 7-0 |
|---|---|---|---|---|---|
| 0 | 0 | 0 | LS(C) | LD(A) | LD(B) |
| 0 | 0 | 1 | LS(C) | LD(A) | ST(B) |
| 0 | 1 | 0 | LS(C) | ST(A) | LD(B) |
| 0 | 1 | 1 | LS(C) | ST(A) | ST(B) |
| 1 | 0 | 0 | LS(C) | DMOVA | LD(B) |
| 1 | 0 | 1 | LS(C) | DMOVA | ST(B) |
| 1 | 1 | 0 | LS(C) | LD(A) | DMOVB |
| 1 | 1 | 1 | LS(C) | ST(A) | BMOVB |

Equation (4) provides the operations performed by the LD(A) instruction subfragment.

$$\begin{Bmatrix} R0 - R7 \\ L0h - L3h \\ L0l - L3l \end{Bmatrix} = {}^*AX \begin{bmatrix} ++ \\ -- \\ ++AM0 \\ ++AM1 \end{bmatrix}; \qquad (4)$$

Table 33 provides the format the LD(A) instruction subfragment in accordance with the exemplary embodiment of the invention.

TABLE 33

LD(A) instruction subfragment format.

| 7 | 6 | 5 | 4 | 3 | 2 | 1 | 0 |
|---|---|---|---|---|---|---|---|
| dreg | | | | A0-A3 | | Amod | |

Equation (5) provides the operations performed by the LD(B) instruction subfragment.

$$\begin{Bmatrix} R0 - R7 \\ L0h - L3h \\ L0l - L3l \end{Bmatrix} = {}^*BX \begin{bmatrix} ++ \\ -- \\ ++BM0 \\ ++BM1 \end{bmatrix}; \qquad (5)$$

Table 34 provides the format the LD(B) instruction subfragment in accordance with the exemplary embodiment of the invention.

TABLE 34

LD(B) instruction subfragment format.

| 7 | 6 | 5 | 4 | 3 | 2 | 1 | 0 |
|---|---|---|---|---|---|---|---|
| dreg | | | | B0-B3 | | Bmod | |

Equation (6) provides the operations performed by the ST(A) instruction sub fragment.

$$*AX\begin{bmatrix}++\\--\\++AM0\\++AM1\end{bmatrix}=\begin{Bmatrix}R0-R7\\L0h-L3h\\L0l-L3l\end{Bmatrix}; \quad (6)$$

Table 35 provides the format the ST(A) instruction subfragment in accordance with the exemplary embodiment of the invention.

TABLE 35

ST(A) instruction subfragment format.

| 7 | 6 | 5 | 4 | 3 | 2 | 1 | 0 |
|---|---|---|---|---|---|---|---|
| dreg | | | | A0-A3 | | Amod | |

Equation (7) provides the operations performed by the ST(B) instruction subfragment.

$$*BX\begin{bmatrix}++\\--\\++BM0\\++BM1\end{bmatrix}=\begin{Bmatrix}R0-R7\\L0h-L3h\\L0l-L3l\end{Bmatrix}; \quad (7)$$

Table 36 provides the format the ST(B) instruction subfragment in accordance with the exemplary embodiment of the invention.

TABLE 36

ST(A) instruction subfragment format.

| 7 | 6 | 5 | 4 | 3 | 2 | 1 | 0 |
|---|---|---|---|---|---|---|---|
| dreg | | | | B0-B3 | | Bmod | |

Table 37 lists the operations performed by the DMOVA instruction subfragment.

TABLE 37

DMOVA instruction subfragment operations.

| (a) | NOP; | NOP for Parallel Instructions. |
|---|---|---|
| (b) | TLOOP; | Tight Loop (Single-Instruction Loop). |
| (c) | $\{R0-R7\}=\begin{Bmatrix}R0-R7\\L0h-L3h\\L0l-L3l\end{Bmatrix};$ | Move Data Register. |
| (d) | $\{R0-R7\}=\{A0-A3\};$ | Move Address Register to Data Register. |
| (e) | $\begin{Bmatrix}A0-A3\\AM0-AM1\end{Bmatrix}=\{R0-R3\};$ | Move Data Register to AGU Register. |
| (f) | $\{A0-A3\}=\{A0-A3\};$ $\{B0-B3\}=\{B0-B3\};$ $\{C0-C3\}=\{C0-C3\};$ | Move Address Register. |
| (g) | IF cond | Conditional for Parallel Instructions. |

Table 38 provides the format the DMOVA instruction subfragment in accordance with the exemplary embodiment of the invention.

TABLE 38

DMOVA instruction subfragment format.

| | 7 | 6 | 5 | 4 | 3 | 2 | 1 | 0 |
|---|---|---|---|---|---|---|---|---|
| (a,b,c) | 1 | R0-R7 (dst) | | | dreg (src) | | | |
| (d) | 1 | 0 | 0 | 0 | A0-A3 (src) | | R0-R3 (dst) | |
| (e) | 1 | 0 | 0 | 0 | A0-A3 (dst) | | R0-R3 (src) | |
| (f) | 1 | 0 | 0 | 1 | A0-A3 (dst) | | A0-A3 (src) | |
| (f) | 1 | 0 | 0 | 1 | B0-B3 (dst) | | B0-B3 (src) | |
| (f) | 1 | 1 | 0 | 0 | C0-C3 (dst) | | C0-C3 (src) | |
| (d) | 1 | 1 | 0 | 1 | A0-A3 (src) | | R4-R7 (dst) | |
| (g) | 1 | 1 | 1 | cond | | | | |

Notes:
The instruction R0 = R0 is decoded as a NOP.
The instruction R1 = R1 is decoded as TLOOP.
The instruction A0 = A0 is decoded as AM0 = R0.
The instruction A1 = A1 is decoded as AM0 = R1.
The instruction A2 = A2 is decoded as AM0 = R2.
The instruction A3 = A3 is decoded as AM0 = R3.
The instruction B0 = B0 is decoded as AM1 = R0.
The instruction B1 = B1 is decoded as AM1 = R1.
The instruction B2 = B2 is decoded as AM1 = R2.
The instruction B3 = B3 is decoded as AM1 = R3.

Thus, by providing MMPF instruction fragments that can contain one or more instruction subfragments, the number of operations that can be performed using a full instruction is further enhanced. For example, a full instruction can cause arithmetic and MAC operations to be performed along with a set of up to three memory move and program flow operations. The ability to perform this many operations using a single instruction further reduces the total number of instructions necessary to perform a given operation and therefore decreases the total instruction memory required on the DSP. Reducing the instruction memory decreases the die size and therefore the cost and power consumption of the DSP, which makes that DSP more suitable for a wide variety of applications include mobile wireless telephony.

Thus, a system and method for controlling a DSP using a highly parallel variable length instruction set has been described. The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. For example, while the invention is described in the context of a DSP, various aspects of the invention are applicable to general computing systems and devices. Thus, the present invention is not intended to be limited to the embodiments shown herein but is to be accorded the widest scope consistent with the principles and novel features disclosed herein.

The invention claimed is:

1. A method of processing instructions, the method comprising:
retrieving first instruction data from an instruction memory, the first instruction data having a first instruction data length, wherein the first instruction data includes a first instruction having a first instruction size and a second instruction;
storing the first instruction data in an instruction register bank that is accessible by two execution units;

outputting the first instruction from the instruction register bank to one of the execution units; and after outputting the first instruction, retrieving second instruction data from the instruction memory when the first instruction size meets or exceeds an instruction fetch threshold but not retrieving the second instruction data from the instruction memory when the first instruction size is less than the instruction fetch threshold;

wherein the instruction memory comprises a plurality of address words, each address word including a corresponding front edge word boundary and a corresponding back edge word boundary;

wherein instructions are stored in the instruction memory;

wherein a first of the instructions is aligned and has a front edge instruction boundary that corresponds to one of the front edge word boundaries or a back edge instruction boundary that corresponds to one of the back edge word boundaries; and wherein a second of the instructions is not aligned and has a front edge boundary that differs from each of the front edge word boundaries and has a back edge boundary that differs from each of the back edge word boundaries.

2. The method of claim 1, wherein the first instruction comprises a plurality of instruction fragments.

3. The method of claim 1, wherein the instruction memory comprises a first word and a second word, and wherein a first portion of the first instruction data resides in the first word and a second portion of the first instruction data resides in the second word.

4. The method of claim 3, wherein the second portion of the first instruction data is stored contiguously with at least a portion of the second instruction data in the second word.

5. The method of claim 3, wherein the second instruction data is stored at least partially in the second word, and wherein an instruction separator code separates the first instruction data and the second instruction data within the second word.

6. The method of claim 1, wherein the first instruction comprises a plurality of instruction fragments, and wherein when the first instruction is outputted a first instruction fragment is executed by a first execution unit and a second instruction fragment is executed by a second execution unit.

7. The method of claim 1, wherein:

the instruction memory comprises a plurality of words, each of the words having a corresponding front edge word boundary and a corresponding back edge word boundary, the instruction memory operable to store a plurality of instructions, each instruction having a corresponding front edge instruction boundary and a corresponding back edge instruction boundary;

wherein the first instruction stored in the instruction memory has a first instruction front edge boundary and a first instruction back edge boundary, and wherein the first instruction front edge boundary does not coincide with any front edge word boundary or the first instruction back edge boundary does not coincide with any back edge word boundary.

8. The method of claim 1, wherein the first instruction size is 48 bits.

9. The method of claim 1, wherein the second instruction data has a second instruction data size, wherein the second instruction data size is selected based at least in part on the first instruction size.

10. The method of claim 9, wherein the second instruction data size is equal to the first instruction size.

11. The method of claim 1, wherein the second instruction data has a second instruction data size, wherein the second instruction data size differs from the first instruction data size.

12. An apparatus comprising:

an instruction register bank configured to store first instruction data that is accessible by a first processing unit and a second processing unit, wherein the first instruction data includes a first instruction having a first instruction size and a second instruction;

wherein the instruction register bank is further configured to output the first instruction to the first processing unit or the second processing unit; and wherein the instruction register bank is further configured to retrieve second instruction data from an instruction memory after outputting the first instruction when the first instruction size meets or exceeds an instruction fetch threshold but to refrain from retrieving the second instruction data when the first instruction size is less than the instruction fetch threshold;

wherein the instruction memory comprises a plurality of address words, each address word including a corresponding front edge word boundary and a corresponding back edge word boundary;

wherein instructions are stored in the instruction memory;

wherein a first of the instructions is aligned and has a front edge instruction boundary that corresponds to one of the front edge word boundaries or a back edge instruction boundary that corresponds to one of the back edge word boundaries; and wherein a second of the instructions is not aligned and has a front edge boundary that differs from each of the front edge word boundaries and has a back edge boundary that differs from each of the back edge word boundaries.

13. The apparatus of claim 12, wherein the second instruction data has a second instruction data size, wherein the second instruction data size is selected based at least in part upon the first instruction size.

14. The apparatus of claim 12, wherein the first instruction size is 48 bits.

15. The apparatus of claim 12, further comprising:

a microprocessor configured to execute one or more instruction fragments stored in the instruction register bank, the microprocessor comprising:

the first processing unit having a plurality of first input ports and the second processing unit having a plurality of second input ports;

a first plurality of registers;

a first plurality of multiplexers, directly coupled to the first and second processing units and to the first plurality of registers, such that the inputs to each of the first plurality of registers may be coupled by the first plurality of multiplexers directly to the outputs of either the first or second processing unit;

a second plurality of multiplexers, directly coupled to the first and second processing units and to the first plurality of registers, such that the outputs from each of the first plurality of registers may be coupled by the second plurality of multiplexers directly to any of the inputs of either the first or second processing unit; and a second plurality of registers, at least one of the second plurality of registers coupled to the first processing unit but not to the second processing unit and at least one of the second plurality of registers coupled to the second processing unit but not to the first processing unit.

16. The apparatus of claim 15, further comprising a plurality of data buses, wherein each data bus is connected to the microprocessor and to a corresponding data memory, and wherein each data bus is configured to exchange data between the microprocessor and the corresponding data memory.

17. The apparatus of claim 15, wherein the microprocessor is further configured to execute a plurality of the instruction fragments during a clock cycle.

18. The apparatus of claim 15, wherein first data that has been processed by the first processing unit is read from the first plurality of registers during a first phase of a first clock cycle and is processed by the second processing unit during a second phase of the first clock cycle.

19. A computer readable medium storing computer-executable instructions, which when executed cause a processor to:

retrieve first instruction data from an instruction memory, wherein the first instruction data includes a first instruction having a first instruction size and a second instruction;

store the first instruction data in an instruction register bank that is accessible by two processing units;

output the first instruction from the instruction register bank to one of the processing units; and retrieve second instruction data from the instruction memory after outputting the first instruction when the first instruction size meets or exceeds an instruction fetch threshold but not retrieve the second instruction data from the instruction memory when the first instruction size is less than the instruction fetch threshold;

wherein the instruction memory comprises a plurality of address words, each address word including a corresponding front edge word boundary and a corresponding back edge word boundary;

wherein instructions are stored in the instruction memory;

wherein a first of the instructions is aligned and has a front edge instruction boundary that corresponds to one of the front edge word boundaries or a back edge instruction boundary that corresponds to one of the back edge word boundaries; and wherein a second of the instructions is not aligned and has a front edge boundary that differs from each of the front edge word boundaries and has a back edge boundary that differs from each of the back edge word boundaries.

20. The computer-readable medium of claim 19, wherein the first instruction size is 48 bits.

* * * * *